(12) United States Patent
Endress et al.

(10) Patent No.: US 10,554,405 B1
(45) Date of Patent: Feb. 4, 2020

(54) METHODS AND SYSTEMS FOR PREPARING AND PERFORMING AN OBJECT AUTHENTICATION

(71) Applicant: Merck Patent GmbH, Darmstadt (DE)

(72) Inventors: Thomas Endress, Munich (DE); Daniel Szabo, Darmstadt (DE); Frederic Berkermann, Darmstadt (DE); Natali Melgarejo Diaz, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 16/271,109

(22) Filed: Feb. 8, 2019

(30) Foreign Application Priority Data

Dec. 20, 2018 (EP) .................................... 18214512

(51) Int. Cl.
*H04L 9/30* (2006.01)
*H04L 9/08* (2006.01)
*H04L 9/32* (2006.01)

(52) U.S. Cl.
CPC ............... *H04L 9/30* (2013.01); *H04L 9/088* (2013.01); *H04L 9/3247* (2013.01)

(58) Field of Classification Search
CPC .......... H04L 9/30; H04L 9/088; H04L 9/3247
See application file for complete search history.

(56) References Cited

U.S. PATENT DOCUMENTS 5,142,578 A * 8/1992 Matyas ............... G06F 9/30003
380/280
5,868,680 A * 2/1999 Steiner ................. A61B 5/0464
600/5

(Continued)

FOREIGN PATENT DOCUMENTS

EP 2 924 916 A1 9/2015
EP 3 340 212 A1 6/2018

(Continued)

OTHER PUBLICATIONS

NPL Search (Google Scholar) (Year: 2019).*

(Continued)

*Primary Examiner* — Samson B Lemma
*Assistant Examiner* — Richard W Cruz-Franqui
(74) *Attorney, Agent, or Firm* — Drinker Biddle & Reath LLP

(57) ABSTRACT

The present invention relates to the field of tracing and anti-counterfeit protection of physical objects, and particularly to preparing and performing a secure authentication of such objects. Specifically, the invention is directed to a method and a system for preparing a subsequent secured authentication of a physical object or group of physical objects by a recipient thereof, to a method and system for authenticating a physical object or group of physical objects, to a method and system of securely providing a time-variant combination scheme for authenticating a physical object or group of physical objects according to the above methods, and to related computer programs corresponding to said methods. The invention is based on the concept of increasing the security level by increasing the information entropy of the data on which the anti-counterfeit protection is based by means of random data communicated to authenticating entities in an algorithmically hidden way.

17 Claims, 13 Drawing Sheets

(56) References Cited

U.S. PATENT DOCUMENTS

| | | | | |
|---|---|---|---|---|
| 5,937,022 A * | 8/1999 | Brunelle | ............... | G06M 7/00 377/10 |
| 6,385,316 B1 * | 5/2002 | Rose | ............... | H04L 9/0618 380/259 |
| 9,638,831 B1 * | 5/2017 | Hoff | ............... | G01W 1/10 |
| 10,193,695 B1 * | 1/2019 | Endress | ............... | H04L 9/3239 |
| 2001/0046292 A1 * | 11/2001 | Gligor | ............... | H04L 9/0662 380/37 |
| 2003/0037767 A1 * | 2/2003 | Breitegger | ............... | F02D 41/009 123/406.58 |
| 2005/0278563 A1 * | 12/2005 | Durham | ............... | G06F 11/2294 714/4.1 |
| 2006/0200855 A1 * | 9/2006 | Willis | ............... | H04L 9/3213 726/2 |
| 2009/0268220 A1 * | 10/2009 | Obata | ............... | H04N 1/00867 358/1.9 |
| 2011/0054979 A1 * | 3/2011 | Cova | ............... | G06Q 10/06 705/7.37 |
| 2012/0079596 A1 * | 3/2012 | Thomas | ............... | G06F 21/55 726/24 |
| 2012/0173474 A1 * | 7/2012 | Chatterjee | ............... | G08G 1/0104 706/52 |
| 2013/0145471 A1 * | 6/2013 | Richard | ............... | G06F 21/562 726/24 |
| 2013/0173928 A1 * | 7/2013 | Kocher | ............... | G06F 21/602 713/189 |
| 2014/0089250 A1 * | 3/2014 | Chatterjee | ............... | G06N 5/048 706/52 |
| 2014/0252077 A1 * | 9/2014 | Corby | ............... | G06K 5/00 235/375 |
| 2014/0329539 A1 * | 11/2014 | Li | ............... | G01S 5/0072 455/456.1 |
| 2014/0367464 A1 * | 12/2014 | Herzig | ............... | G06K 1/121 235/375 |
| 2015/0199300 A1 * | 7/2015 | Picciotti | ............... | G07C 5/085 701/1 |
| 2015/0281260 A1 * | 10/2015 | Arcamone | ............... | H04L 63/1408 726/11 |
| 2015/0324789 A1 * | 11/2015 | Dvorak | ............... | G06Q 20/3823 705/67 |
| 2016/0080425 A1 * | 3/2016 | Cianfrocca | ............... | H04L 63/0227 726/1 |
| 2016/0197949 A1 * | 7/2016 | Nyhuis | ............... | H04L 63/1425 713/190 |
| 2016/0294482 A1 * | 10/2016 | Michel | ............... | H04B 10/808 |
| 2016/0294829 A1 * | 10/2016 | Angus | ............... | H04L 63/0876 |
| 2016/0300234 A1 * | 10/2016 | Moss-Pultz | ............... | G06F 21/10 |
| 2016/0301705 A1 * | 10/2016 | Higbee | ............... | G06F 16/35 |
| 2017/0039568 A1 * | 2/2017 | Tunnell | ............... | G06Q 20/4014 |
| 2018/0012151 A1 * | 1/2018 | Wang | ............... | G06Q 10/0639 |
| 2018/0191754 A1 * | 7/2018 | Higbee | ............... | H04L 63/20 |
| 2018/0232693 A1 * | 8/2018 | Gillen | ............... | G06Q 10/0834 |
| 2018/0276600 A1 * | 9/2018 | Fuller | ............... | G06K 7/12 |
| 2019/0121977 A1 * | 4/2019 | Gordeychik | ............... | G06F 21/552 |

FOREIGN PATENT DOCUMENTS

| | | |
|---|---|---|
| WO | 2014/095737 A1 | 6/2014 |
| WO | 2017/196655 A1 | 11/2017 |

OTHER PUBLICATIONS

Partial European Search Report issued in related application EP 18214512.8, dated May 13, 2019, 11 pages.
Koh et al., "White Paper, Securing the Pharmaceutical Supply Chain," Jun. 1, 2003, retrieved from internet website: http://ed-w.info/MIT-AUTOID-WH021.pdf on Oct. 31, 2007, 18 pages.
Extended European Search Report issued in related application EP 18214512.8, dated Aug. 26, 2019, 14 pages.

* cited by examiner

METHODS AND SYSTEMS FOR PREPARING AND PERFORMING AN OBJECT AUTHENTICATION

CROSS-REFERENCE TO RELATED APPLICATIONS

This application claims priority to European (EP) patent application No. 18214512.8, filed Dec. 20, 2018, which is incorporated herein by reference in its entirety.

FIELD OF THE INVENTION

The present invention relates to the field of tracing and anti-counterfeit protection of physical objects, such as products like for example pharmaceutical products or other health-related products, and particularly to preparing and performing a secure authentication of such objects. Specifically, the invention is directed to a method and a system for preparing a subsequent secured authentication of a physical object or group of physical objects by a recipient thereof, to a method and system for authenticating a physical object or group of physical objects, to a method and system of securely providing a time-variant combination scheme for authenticating a physical object or group of physical objects according to the above methods, and to related computer programs corresponding to said methods.

BACKGROUND

In many industries, counterfeiting of products is a substantial problem that significantly impacts not only the revenues of original product manufacturers, but may even pose a serious threat to health and even life of consumers or operators of counterfeited, i.e. fake products. Such safety relevant product categories include in particular parts for automobiles and aircraft, components for the construction of buildings or other infrastructure, food, and even medical devices and pharmaceuticals.

Furthermore, in a broad range of different industries traceability of goods and physical objects is a key requirement. This applies in particular to logistics and supply chain infrastructures and to highly regulated/structured work flow environments. Examples are industry work places being controlled by official regulators such as the FDA (US Food & Drug Administration), and/or being certified e.g. according to GMP (Good manufacturing practice), GLP (Good laboratory practice), GCP (Good clinical practice), or DIN ISO or similar other standards and rules. Each of these regulated environments requires in particular an audit trail and auditable technologies. A further example is the traceability of high value products such as industrial spare parts in order to proof authenticity and intended use of these parts in secondary markets.

In order to limit counterfeiting and provide supply chain and work flow integrity, including recognition and authentication of products within work flows and supply chains, various industries have developed a number of different protection measures and identification solutions. Broadly used protection measures comprise adding a so-called security feature to a product, the feature being rather difficult to fake. For example, holograms, optically variable inks, security threads and embedded magnetic particles are known security features which are difficult to reproduce by counterfeiters. While some of these security features are "overt", i.e. can be easily seen or otherwise recognized by a user of the product, other security features are "covert", i.e. they are hidden and can only be detected by using specific devices, such as sources of UV-light, spectrometers, microscopes or magnetic field detectors, or even more sophisticated forensic equipment. Examples of covert security features are in particular printings with luminescent ink or ink that is only visible in the infrared part of the electromagnetic spectrum but not in its visible part, specific material compositions and magnetic pigments.

A specific group of security features, which are in particular used in cryptography, is known as "Physical Unclonable Functions" (PUFs). PUFs are sometimes also referred to as "Physically Unclonable Functions" or "Physical Random Functions". A PUF is a physical entity that is embodied in a physical structure and is easy to evaluate but hard to predict, even for an attacker with physical access to the PUF. PUFs depend on the uniqueness of their physical microstructure, which typically includes a random component that is already intrinsically present in the physical entity or is explicitly introduced into or generated in the physical entity during its manufacturing and which is substantially uncontrollable and unpredictable. Accordingly, even PUFs being produced by the exact same manufacturing process differ at least in their random component and thus can be distinguished. While in most cases, PUFs are covert features, this is not a limitation and overt PUFs are also possible. PUFs are furthermore ideal for enabling passive (i.e. without active broadcasting) identification of physical objects.

PUFs are known in particular in connection with their implementation in integrated electronic circuits by way of minimal unavoidable variations of the produced microstructures on a chip within given process-related tolerances, and specifically as being used for deriving cryptographic keys therefrom, e.g. in chips for smartcards or other security related chips. An example of an explanation and application of such chip-related PUFs is disclosed in the article "*Background on Physical Unclonable Functions (PUFs)*", Virginia Tech, Department of Electrical and Computer Engineering, 2011, which is available in the Internet at the hyperlink: http://rijndael.ece.vt.edu/puf/background.html.

However, also other types of PUFs are known, such as random distributions of fibers in paper used as a substrate for making banknotes, wherein the distribution and orientation of fibers can be detected by specific detectors and used as a security feature of the banknote. Also, upconverting dyes (UCDs), particularly secret mixtures thereof, may be used as PUFs.

In order to evaluate a PUF, a so-called challenge-response authentication scheme is used. The "challenge" is a physical stimulus applied to the PUF and the "response" is its reaction to the stimulus. The response is dependent on the uncontrollable and unpredictable nature of the physical microstructure and thus can be used to authenticate the PUF, and thus also a physical object of which the PUF forms a part. A specific challenge and its corresponding response together form a so-called "challenge-response pair" (CRP).

Anti-counterfeit protection methods and systems based on using PUFs to authenticate products are described in each of the two European Patent Applications published as EP 3 340 212 A1 and EP 3 340 213 (A1) and in the further European Patent Application EP 18 170 044.4, the content of each of which is incorporated herein in its entirety by way of reference. Further anti-counterfeit protection methods and systems based on automatic object recognition and authentication based on such recognition are described in the further European Patent Application EP 18 170 047.7, the content of which is also incorporated herein in its entirety by way of reference.

Asymmetric cryptography, which is sometimes also referred to as "public key cryptography" or "public/private key cryptography", is a known technology based on a cryptographic system that uses pairs of keys, wherein each pair of keys comprises a public key and a private key. The public keys may be disseminated widely and are usually even publicly available, while the private keys are kept secret and are usually only known to their owner or holder. Asymmetric cryptography enables both (i) authentication, which is when the public key is used to verify that a holder of the paired private key originated a particular information, e.g. a message or stored data containing the information, by digitally signing it with his private key, and (ii) protection of information, e.g. a message or stored data, by way of encryption, whereby only the owner/holder of the paired private key can decrypt the message encrypted with the public key by someone else.

Recently, blockchain technology has been developed, wherein a blockchain is a public ledger in the form of a distributed database containing a plurality of data blocks and which maintains a continuously-growing list of data records and is hardened against tampering and revision by cryptographic means. A prominent application of blockchain technology is the virtual Bitcoin currency used for monetary transactions in the Internet. A further known blockchain platform is provided for example by the Ethereum project. In essence, a blockchain can be described as a decentralized protocol for logging transactions between parties, which transparently captures and stores any modifications to its distributed database and saves them "forever", i.e. as long as the blockchain exists. Storing information into a blockchain involves digitally signing the information to be stored in a block of the blockchain. Furthermore, maintaining the blockchain involves a process called "blockchain mining", wherein so-called "miners" being part of the blockchain infrastructure, verify and seal each block, such that the information contained therein is saved "forever" and the block can no longer be modified.

A further new ledger technology is known by the name of the "Tangle", which is blockless and permissionless distributed ledger architecture, which is scalable, lightweight, and provides a consensus in a decentralized peer-to-peer system. A prominent related technology using the Tangle as a technical basis is known as "IOTA", which is a transactional settlement and data integrity layer for the Internet of Things. However, the term "blockless distributed ledger" is not intended to be limited specifically to the Tangle technology.

SUMMARY OF THE INVENTION

It is an object of the present invention to provide a further improved way of effectively authenticating a physical object, such as a product, or a group of such objects.

A solution to this problem is provided by the teaching of the appended independent claims. Various preferred embodiments of the present invention are provided by the teachings of the dependent claims. In order to provide better orientation to the reader several headlines (in italics) have been provided to structure the below overview of the various aspects of the overall authentication solution provided by the present invention. However, these headlines are in no way intended to limit the invention disclosed herein. In particular, any definitions of terms provided herein are applicable throughout this document and are not limited to an application to a particular section, aspect or embodiment contained herein.

1. Preparing a Subsequent Authentication

A first aspect of the invention is directed to a method of preparing a subsequent secured authentication of a physical object or group of physical objects by a recipient thereof. In particular, the method may be implemented as a computer-implemented method.

The method comprises: (i) receiving or generating predicted context data representing a predicted future location relating to a designated next recipient of the physical object or group of physical objects and a related future time of presence of the physical object or group of physical objects at that future location; (ii) receiving or generating random context data indicating a random location and a random time; (iii) combining, according to a first predetermined combination scheme, the predicted context data and the random context data to thereby derive modified context data representing a modified random location and a modified random time, each resulting from the combining; (iv) encrypting the modified context data to obtain a secured start data package representing the modified context data; and (v) storing said secured start data package (SSDP), or causing it to be stored, to a first data storage being accessible for providing the secured data package for a subsequent secured authentication of a physical object or group of physical objects.

The location may particularly be defined in terms of geocoordinates, e.g. based on respective geolocation data generated by means of a satellite-based radio navigation system, such as those known as GPS, GALILEO or GLONASS.

The term "physical object" or in short "object", as used herein, refers to any kind of physical object, in particular to any kind of man-made product, such as for example and without limitation a pharmaceutical product or other health-related product, or a natural object, such as for example and without limitation a vegetable or a piece of a natural raw material; or a packaging of any one or more of the foregoing. A physical object may itself comprise multiple parts, e.g. both a consumable good and a packaging thereof. The term "group of physical objects", as used herein, refers to a group of objects, which are per se separate or separable, but which are meant to be distributed together, e.g. in a same physical and/or commercially tied bundle or package, and which thus stand in a certain relationship to each other with regards to their distribution to one or more recipients.

The term "authentication", as used herein, refers to confirming the truth of an attribute of a physical object, particularly its kind and its originality, claimed true by an entity. The term "secured authentication" as used herein, refers to an authentication which is secured by one or more protection measures against unauthorized interference with the authentication process or the means used for it. By way of example and without limitation, such securing may involve encrypting and/or digitally signing information on which such authentication is based as such protection measures. Specifically, said "secured" start data package may be considered information that is secured by any one or more of such protection measures in order to enable a subsequent secured authentication of a physical object or group of physical objects based on this secured information.

The term "context data", as used herein, refers to data representing at least a specific location and time, which thus together define a specific context, e.g. of an event. In particular, context data may relate to an event defining or defined by the presence of a particular physical object or group of physical objects at the location and time represented by the related context data. The location defined in context data may particularly relate to a real physical position, e.g. expressed in geo coordinates, or to a virtual position, such as a particular step or milestone within a defined work flow or process flow, or both.

The term "combination scheme", as used herein, refers to a scheme, such as but not limited to a mathematical operation, according to which two or more data items or sets of data can be combined. The scheme needs to be inversible and may particularly be an inversible mathematical function. For example and without limitation, such a mathematical function may be defined in terms of an inversible matrix multiplication. Specifically, the combining may comprise without limitation a mere aggregation, such as juxtaposing the bits of two or more binary data sets.

The terms "storing" data or "causing it to be stored", as used herein, may particularly include storing the data into a blockchain or distributed ledger in an indirect manner, i.e. by requesting an actual performance of such storing from one or more intermediaries, such as a miner from a plurality of miners in the case of a blockchain, which then actually perform(s) the storing.

Where the term "comprising" or "comprises" is used in the present description and claims, it does not exclude other elements or steps. Where an indefinite or definite article is used when referring to a singular noun e.g. "a" or "an", "the", this includes a plural of that noun unless something else is specifically stated.

The terms "first", "second", "third" and the like in the description and in the claims, are used for distinguishing between similar elements and not necessarily for describing a sequential or chronological order. It is to be understood that the terms so used are interchangeable under appropriate circumstances and that the embodiments of the invention described herein are, unless this is explicitly excluded or technically impossible, capable of operation in other sequences than described or illustrated herein.

The headings provided herein are solely intended to provide additional structure to this description of the present invention and thus improve its legibility, but they are not intended to limit it in any way.

The method of the first aspect of the present invention defines one of several aspects of an overall object authentication solution presented herein. Within the overall solution, it serves to prepare a subsequent secured authentication of a physical object or group of physical objects by a recipient thereof, for example by a recipient representing a node in a supply chain for said physical object or objects. It is a purpose of this method, to provide a data package that is secured by means of encryption and that makes available, to authorized recipients that are enabled to decrypt the data package, an initial set of information which is needed for said subsequent authentication process. It is noted, that this method of preparing a subsequent secured authentication may be and will in many cases be performed by a different entity than the actual subsequent authentication itself. In particular, the encrypted data package comprises information that is based, in parts, on random data, which adds a further level of security to the authentication process as a whole, because unlike actual supply-chain related context data, such as location and time at which a particular physical object is present at that location, random data may typically not be predicted by an unauthorized third party.

In the following, preferred embodiments of this method are described, which may be arbitrarily combined with each other or with other aspects of the present invention, unless such combination is explicitly excluded or technically impossible.

(a) Selected Embodiments Relating Particularly to the Creation of the Secure Start Data Package In some embodiments, encrypting the modified context data comprises encrypting the modified context data by means of an asymmetric encryption scheme and a related public key pertaining to said designated next recipient. In contrast to symmetric encryption, where the encryption key has to be kept secret and thus has to be exchanged in a secure manner, using asymmetric encryption allows for using public keys for the encryption. Unlike keys for symmetric encryption, such public keys may be exchanged openly without creating security issues.

In some embodiments, encrypting the modified context data further comprises digitally signing the modified context data or the secured start data package resulting from the encrypting. The digital signing may in particular be performed by means of an asymmetric encryption scheme and a related private key pertaining to a provider of said physical object or group of physical objects or to the signing entity. The digital signing may be used to further increase the security of the subsequent authentication being based on the modified to context data, as it adds a further security level allowing for a verification of the originality of the encrypted modified context data by a recipient.

The term "digital signature" or "digitally signing" etc., as used herein, refers to (using) a set of one or more digital values that confirms the identity of a sender or originator of digital data and the integrity of the later. A frequently used way of creating a digital signature comprises generating a hash value from the data to be protected by way of application of a suitable cryptographic hash function. This hash value is then encrypted with a private key (sometimes also called "secure key") of an asymmetric cryptographic system, e.g. based on the RSA cryptographic system, wherein the private key is typically known only to the sender/originator. Usually, the digital signature comprises the digital data itself as well as the hash value derived from it by the sender/originator. A recipient may then apply the same cryptographic hash function to the received digital data, use the public key corresponding to said private key to decrypt the hash value comprised in the digital signature, and compare the decrypted hash value from the digital signature with the hash value generated by applying the cryptographic hash function to the received digital data. If both hash values match, this indicates that the digital information has not been modified and thus its integrity has not been compromised. Furthermore, the authenticity of the sender/originator of the digital data is confirmed by way of the asymmetric cryptographic system, which ensures that the encryption using the public key only works, if the encrypted information was encrypted with the private key being mathematically paired to that public key. The representation of the digital signature may particularly be implemented using an RFID transmitter or a single- or multi-dimensional barcode, such as a QR-Code or a DATAMATRIX-code or simply as a multi-digit number.

The term "cryptographic hash function", as used herein, refers to a special type of hash function, i.e. of a mathematical function or algorithm that maps data of arbitrary size to a bit string of a fixed size (a hash value), which is designed to also be a one-way function, i.e. a function that is easy to compute on every input, but hard to invert given the image of a random input. Preferably, the cryptographic hash function is a so-called "collision resistant" hash function, i.e. a hash function that is designed such that it is difficult, particularly nearly impossible in practice, to find two different data sets d1 and d2 such that hash(d1)=hash(d2). Prominent examples of such hash functions are the hash functions of the SHA-family, e.g. the SHA-3 function or the hash functions of the BLAKE family, e.g. the BLAKE2 function. In particular, so-called "provably secure cryptographic hash functions" may be used. These are hash functions for which a certain sufficient security level can be mathematically proven.

In some embodiments, storing said secured start data package to said first data storage involves storing the secured start data package to a blockchain or a blockless distributed ledger. In this way, the start data package may be saved and stored in such a way, that it is substantially impossible to tamper with it, e.g. destroy or manipulate it, in an unauthorized way, and in particular without such tampering attempt becoming apparent. Furthermore, storing the start data package to a blockchain or blockless distributed ledger allows for easy access to the start data package from remote, for example by an authorized recipient along a supply chain of the related physical object or group of objects.

(b) Selected Embodiments Relating Particularly to the Creation of Initialization Data In some embodiments, in a first variant, the method further comprises: (i) detecting by means of one or more sensors at least one discriminating characteristic of said physical object or group of physical objects, to obtain for each discriminating characteristic respective identification data representing an identity of said related physical object or group of physical objects; and (ii) applying a second predetermined cryptographic hash function to a data set resulting from combining, according to a second predetermined combination scheme, the one or more respective identification data obtained from the set of said at least one discriminating characteristic and the random context data to obtain an original hash value.

In a second variant, the method further comprises: (i) detecting by means of one or more sensors at least one discriminating characteristic of said physical object or group of physical objects to obtain for each discriminating characteristic respective identification data representing an identity of said related physical object or group of physical objects; (ii) applying, to each of said identification data, a respective first predetermined cryptographic hash function to obtain a respective initial hash value related to the respective discriminating characteristic; (iii) applying a second predetermined cryptographic hash function to a data set resulting from combining, according to a second predetermined combination scheme, the one or more respective initial hash values obtained from the set of said at least one discriminating characteristic and the random context data to obtain an original hash value (Ho). Accordingly, the second variant differs from the first variant in that the step (ii) of applying the first predetermined hash function is added.

In a third variant, the method further comprises applying a second predetermined cryptographic hash function to the random context data to obtain an original hash value. Accordingly, the third variant differs from the first and second variants in that it is not based on detecting any discriminating characteristic of said physical object or group of physical objects and deriving the original hash value Ho based thereon. Instead, it relies merely on the random context data as essential input.

For all three of the above variants, the method comprises in addition outputting initialization data representing said respective original hash value.

Specifically, the approach according to the second variant is thus based on a hash stack comprising two subsequent hash operation levels. The first level relates to applying a respective first cryptographic hash function to the respective identification data and the second level relates to applying a respective second cryptographic hash function to said combination of said initial hash values resulting from the first level and said random context data. Using both the initial hash values derived from said discriminating characteristic and the context information increases the entropy (in the sense of information theory and mathematics) of the resulting initialization data. This allows for a very high level of security of the whole authentication process, even in cases where the respective individual entropy of said initial hash values and/or of the context information is rather limited and would itself not allow for a sufficient security level. In addition, it also allows for limiting the amount of involved data, in particular of data that has to be exchanged, directly or indirectly, with a recipient, and thus for optimizing efficiency or the authentication process. With regards to the term "combination scheme", reference is made to the above-provided definition thereof.

The first and third variants, on the other hand, have the advantage of lower complexity in comparison to the first advantage and may particularly be suitable for applications, where a lower degree of security than what can be achieved by the first variant is sufficient.

In some related embodiments, the discriminating characteristic is provided as a particular set of one or more individual discriminating properties of said physical object or group of physical objects, by means of which it may be safely identified. Such properties may particularly comprise properties which are rather difficult to tamper with, for example because they are specifically secured against tampering and/or because they are very difficult to tamper with, already based on their nature. European Patent Application EP 18 170 047.7 describes such discriminating characteristics and their use for the purpose of object authentication in detail.

In further related embodiments, the discriminating characteristic is provided by a specific security feature specifically added to or created in or on said physical object or group of physical objects. This allows particularly for enabling authentication of such physical objects or groups of physical objects which themselves do not provide reliable discriminating characteristics of their own, on which a secure authentication could be based.

In further related embodiments, at least one of said discriminating characteristics comprises a physical unclonable function, PUF. Furthermore, (i) detecting said at least one discriminating characteristic to obtain respective identification data related thereto comprises: (i-1) applying a respective challenge of a respective predetermined challenge-response authentication scheme to the PUF to trigger a response by the PUF according to said authentication scheme in reaction to said challenge, and (i-2) detecting said respective response and generating respective identification data representing said response; (ii) applying a respective first predetermined cryptographic hash function comprises applying the respective first predetermined cryptographic hash function to said data representing said response to obtain a respective PUF-related initial hash value; and (iii) outputting initialization data comprises outputting respective identification data related to said discriminating characteristic, the identification data comprising a representation of said respective PUF-related initial hash value. In this way, the particular discriminating characteristic of physical unclonable functions can be used as a basis of enabling the authentication of said physical objects or groups of physical objects, which allows for an even greater level of security due to the virtually impossible cloning of PUFs.

In some embodiments, applying said second predetermined cryptographic hash function to obtain the original hash value further comprises applying same in addition to a time and location-invariant information identifying or being otherwise specifically related to the physical object or group of physical objects, respectively. Specifically, the physical object or group of physical objects may be a product or group of products, respectively, and said time-invariant or location-invariant information may comprise a serial number relating to that product or group of products. Applying said second predetermined cryptographic hash function to said time-invariant or location-invariant information may particularly be performed by applying said hash function to a set or other combination of data, wherein such set or other combination of data represents, amongst others, said time-invariant or location-invariant information. Adding said time and location-invariant information to the data which the second predetermined cryptographic hash function is being applied adds even further entropy and may thus even increase the achievable security of the overall authentication process. The time and location-invariant information, such as for example one or more serial numbers may particularly be represented by a marking on the physical object or group of physical objects and/or may be implemented using an RFID transmitter or a single- or multi-dimensional barcode, such as a QR-Code or a DATAMATRIX-code or simply as a multi-digit number.

In some embodiments, outputting said initialization data comprises one or more of the following: (i) adding a representation of said initialization data to said physical object or group of physical objects; (ii) storing said representation of said initialization data or causing it to be stored to a third data storage and adding to said physical object or group of physical objects a representation of a pointer indicating where said initialization data can be accessed in the third data storage. This third data storage may be the same or different from said first data storage mentioned above. Both of these options (i) and (ii) allow for a particularly simple way of communicating said initialization data to further recipients along a supply chain for the physical object or group of physical objects. Specifically, no direct communication link, such as an electronic data exchange, has to be established between a provider and the respective recipient of said objects or group of objects.

(c) Selected Embodiments Relating Particularly to Preparing a Further Subsequent Authentication by a Further Recipient In some embodiments, the method further comprises: (i) receiving a request for determination of a further secured start data package relating to further predicted context data representing a further predicted future location relating to a different further designated next recipient of the physical object or group of physical objects and a related future time of presence of the physical object or group of physical objects at that further future location; and (ii) performing the present method based on that further predicted context data to determine and store, or causing it to be stored, said requested further secured start data package relating to further predicted context data. This approach enables a forwarding of the physical objects or group of physical objects along a supply chain in such a way that such further designated next recipient may request a respective previous node along the supply chain that is adapted to perform the method according to these embodiments to generate a respective secured start data package for a next hop along the supply chain starting at that further designated next recipient. Accordingly, not every node along the supply chain has to be able to prepare the authentication at a yet further recipient, but instead such previous node, which may particularly play the role of a central or overall authority to manage the determination and storage of further secured start data packages, may be requested to perform that preparation instead and provide a respective secured start data package for said next hop. Specifically, the requested further start data package may be determined based, in addition to the respective predicted context data, on newly generated random context data or on random context data previously determined in the course of determining a respective start data package for a previous recipient.

In some related embodiments, the method further comprises storing the resulting further start data package or causing it to be stored in a data storage that is accessible by the further designated next recipient. Specifically, without limitation, said data storage may be said first data storage mentioned above. Storing the resulting further start data package in said data storage provides an efficient way of making it available to said requesting next recipient in a way, where no direct communication link between the node providing start data package and the requesting next recipient is needed. Particularly, the data storage may again be a blockchain or a blockless distributed ledger, which provides a very high level of security against tampering with that further start data package by unauthorized third parties.

(d) Embodiments Relating Particularly to Digitally Signing the Original Hash Value In some embodiments, the method further comprises: (i) signing said obtained original hash value with a digital signature pertaining to a supplier of said physical object or group of physical objects to the respective next recipient; and (ii) including said digital signature in the output respective initialization data or further initialization data, respectively. The supplier may particularly be an original supplier or an intermediate supplier along the supply chain for said physical object or group of physical objects. Accordingly, the respective initialization data refers to original initialization data in the case of an original supplier and to respective further initialization data in the case of an intermediate supplier. Adding a digital signature further increases the security level, because it provides a secure possibility of verifying, by the respective recipient, the authenticity of the signed original hash value in the output initialization data.

(e) System for Preparing a Subsequent Secured Authentication

A second aspect of the present invention relates to a system for preparing a subsequent secured authentication of a physical object or group of according to the first aspect of the present invention any one of the preceding claims. Specifically, the system may be adapted to perform this method according to any one or more of its embodiments described herein. Accordingly, the description of this method and its embodiments and its advantages applies mutatis mutandis to this system.

2. Method of Authenticating a Physical Object or Group of Physical Objects

A third aspect of the present invention relates to a method of authenticating a physical object or group of physical objects. In particular, the method comprises different alternative variants and may be implemented as a computer-implemented method.

The method comprises:

(i) receiving and decrypting a secured start data package representing encrypted context data representing a location and a related time to recover said context data;

(ii) receiving or determining current context data representing a current location of the physical object or group of physical objects and a related current time of presence of the physical object or group of physical objects at that current location;

(iii) combining, according to a predetermined combination scheme, the current context data with the decrypted context data to thereby determine test context data, wherein the combination scheme defines an inverse operation to a corresponding combination operation previously used to generate the received context data;

(iv) accessing initialization data related to said physical object or group of physical objects to recover from it an original hash value being represented by the initialization data.

The method further comprises, according to said different variants, (v) one of the following processes a) to c):

a) Detecting, by means of one or more sensors, at least one discriminating characteristic of said physical object or group of physical objects to obtain respective identification data related to said respective discriminating characteristic, this identification data representing a presumed identity of said related physical object or group of physical objects; and generating a test hash value by application of a second predetermined cryptographic hash function to a combination, according to a further predetermined combination scheme, of the test context data and each of said identification data and preferably a time-invariant and location-invariant information identifying or being otherwise specifically related to the said physical object or group of physical objects; or b) Detecting, by means of one or more sensors, at least one discriminating characteristic of said physical object or group of physical objects to obtain respective identification data related to said respective discriminating characteristic, this identification data representing a presumed identity of said related physical object or group of physical objects;

applying a respective first predetermined cryptographic hash function to the respective identification data to obtain a respective initial hash value related to said discriminating characteristic; and generating a test hash value by application of a second predetermined cryptographic hash function to a combination, according to a further predetermined combination scheme, of the test context data and each of said initial hash values, and preferably a time-invariant and location-invariant information identifying or being otherwise specifically related to the said physical object or group of physical objects;

c) generating a test hash value by application of a second predetermined cryptographic hash function to the test context data or to a combination, according to a further predetermined combination scheme, of the test context data and a time-invariant and location-invariant information identifying or being otherwise specifically related to the said physical object or group of physical objects.

For each of the above processes a) to c), the second predetermined cryptographic hash function is equal to a corresponding cryptographic hash function previously used to determine the original hash value represented by the initialization data, and wherein said further combination scheme is equal to a corresponding combination scheme previously used to determine the original hash value represented by the initialization data.

The method further comprises: (vi) generating a first reading result comprising (vi-1) a representation of the test hash value and a representation of the original hash value, or (vi-2) a matching output indicating whether or not, according to at least one predetermined matching criterion, the test hash value matches said original hash value and thus indicates authenticity of the physical object or group of physical objects.

In case any one or more of the above steps of the method fail for any reason, e.g. if the initialization data cannot be successfully accessed or the secured start data package cannot be read, the first reading result may particularly comprise or consist of an output indicating an authentication failure.

This method of authenticating (authentication method) relates to the method of the first aspect of the present invention (preparation method) in that the latter serves to prepare a subsequent authentication of a physical object or group of physical objects according to this authenticating method according to the third aspect of the present invention. Furthermore, this method of authenticating is based on the concept that the authentication may be performed by comparing two hash values, one of which was previously generated by another entity by means of said method of preparing a subsequent authentication according to the first aspect, and the other of which is produced by the respective authenticating recipient itself based on both the related secure start data package provided as a result of said preparation method and identification data being derived from the physical object or group of objects to be authenticated.

Accordingly, the start data package provides information relating to the predicted context data of the recipient, i.e. in particular the location and time, where and when the recipient is meant to receive said physical object or group of physical objects, and the authentication method then uses this start data package, the received original hash value generated by preparation method, its current context data, and for process variants a) and b), in addition identification data (or corresponding initial hash values) derived from a detection of the one or more discriminating characteristics of the physical object or group of physical objects to generate a test hash value. If the physical object or group of physical objects is original and is received at the recipient at the predicted location and time (at least within some defined tolerance margin which may particularly correspond to the precision of the determination of the predicted context data and current context data) the test hash value will be a successful reconstruction of the original hash value generated by the preparation method and accordingly the second and test hash values derived by the authentication method will match, thus indicating a successful authentication. Otherwise, the authentication fails. The process of comparing the original and test hash values may be performed automatically or manually on the basis of the output values of these two hash values.

(a) Selected Embodiments Relating Particularly to Obtaining the Identification Data In some embodiments, at least one of said discriminating characteristics comprises a physical unclonable function, PUF, and detecting said discriminating characteristic to obtain respective identification data related thereto comprises: (i) applying a respective challenge of a respective predetermined challenge-response authentication scheme to the PUF to trigger a response according to said authentication scheme in reaction to said challenge; and (ii) detecting a respective response by the PUF in accordance with the respective challenge-response authentication scheme in reaction to the challenge and deriving therefrom said respective identification data. As PUFs are per se virtually impossible to clone or otherwise reconstruct, their use further increases the achievable security level of the overall authentication solution.

In some embodiments, obtaining the identification data comprises: (i) sensor-based detecting of one or more discriminating characteristics of said physical object or group of physical objects; (ii) generating object data representing said one or more discriminating characteristics of said physical object or group of physical objects; (iii) communicating said object data to a system for automatic object recognition; and (iv) receiving the digitally signed identification data from said system in response to said communicating of said object data. These embodiments relate particularly to an authentication method, such as those described in EP 18 170 047.7, where particularly one or more characteristics of a physical object or group of physical objects to be authenticated, which characteristics form part of the objects or group of objects per se and do not need to be added as a separate security feature, form the basis of identifying and thus authenticating the object or group of objects. In this case, said system for automatic object recognition is typically different from the recipient itself and is adapted to receive the object data and in return provide an object recognition result in the form of digitally signed identification data.

In some embodiments, said physical object or group of physical objects comprises a marking. The marking comprises a representation of said initialization data and/or a representation of a pointer indicating a location where said initialization data can be accessed; and accessing said initialization data comprises, as applicable: (i) reading the representation of said initialization data in the marking, or (ii) reading the representation of the pointer in the marking and acquiring the initialization data from a data storage location indicated by the pointer; and if the initialization data comprises a digital signature, verifying the respective supplier of said physical object or group of physical objects based on a verification of said digital signature. Accordingly, these embodiments are particularly useful when the marking serves to communicate the initialization data, directly or indirectly via the pointer, to a recipient as an input to the authentication method. In this way, the initialization data is conveyed by the object or group of objects itself, so that no further communication channel from the respective supplier to the respective next recipient needs to be established.

(b) Selected Embodiments Relating Particularly to Outputting and Storing Data Relating to the Authentication In some embodiments, the method further comprises outputting a representation of said current context data or a subset thereof or information derived therefrom, as a second reading result. Accordingly, the second reading result may particularly represent data related to supply-chain management, as it indicates context data describing a location and time, at which the object or group of objects is or was present at the current recipient defining a node along the supply chain. Thus, the authentication method serves at the same time as source of supply chain management data.

In some embodiments, the method further comprises a storage process comprising storing the first reading result, or causing it to be stored, into a block of a blockchain of a first set of one or more blockchains or into one or more nodes of a blockless distributed ledger of a first set of one or more blockless distributed ledgers. In particular, causing the first reading result to be stored may comprise causing another device, such as a separate and optionally even remotely located computer being configured to perform (i) blockchain mining or (ii) writing into a node of a blockless distributed ledger, respectively, to store the first reading result accordingly. These embodiments enable a secure, reliable storage with very high data integrity, such that it is essentially impossible to manipulate or erase or otherwise taper with or lose such data, e.g. due to unintended or deliberate deletion or due to data corruption. Thus, the complete authentication history remains available. Furthermore, the stored information can be accessed wherever access to the blockchain respectively distributed ledger is available. This allows for a safe and distributed storage and access to the stored data, e.g. for integrity verification purposes such as checking whether a supplier of a product (object) was in fact the originator of the product, or not. Based on this embodiment, the physical world, to which the objects belong, can be connected to the power of blockchain or blockless distributed ledger technology. Thus, a high degree of traceability of the origin and supply chain of physical objects, such as products, can be achieved.

In some related embodiments, (i) detecting of discriminating characteristics of the physical object or group of physical objects comprises detecting a plurality of different ones of such discriminating characteristics to obtain based thereon for each of the discriminating characteristics respective individual set of identification data representing the physical object or group of physical objects; (ii) generating the test hash value is performed for each of the individual sets of identification data separately such as to obtain for each of the individual sets of identification data a respective individual test hash value; (iii) generating the first reading result is performed for each of the individual test hash values separately such as to obtain for each of the discriminating characteristics a respective individual first reading result; and (iv) the storage process comprises storing each of said individual first reading results respectively causing to it be stored into a block of a respective individual dedicated blockchain in said first set of blockchains or into one or more nodes of a respective individual dedicated blockless distributed ledger in said first set of blockless distributed ledgers. In this way, the achievable security can be further increased, because on the one hand further discriminating characteristics of the physical object or group of physical objects are involved, which such increases the difficulty of counterfeiting same, and on the other hand the individual first reading results are stored in different individual dedicated blockchains, which increases the difficulty of manipulating or otherwise compromising in an unauthorized way the related data track stored in the blockchain environment or respective blockless distributive ledger environment. In some variants, these embodiments may be implemented in addition to any one of the above-described processes a) and b).

In some further related embodiments, the storage process further comprises storing said second reading result or causing it to be stored, respectively, into a block of a blockchain of a second set of one or more blockchains, the blockchain being separate from the blockchains in the first set of blockchains, or into one or more nodes of a blockless distributed ledger of a second set of one or more blockless distributed ledgers, the blockless distributed ledger being separate from the blockless distributed ledgers in the first set of blockless distributed ledgers, respectively. These embodiments allow for additionally storing and thus saving the second reading result independently from the first reading result, into a respective other blockchain, thus providing the advantages discussed in connection with the immediately preceding embodiment also in relation to the second reading result. Using different blockchains or blockless distributed ledgers for the first and second reading results further provides the advantage of easily supporting a combination of an existing (second) blockchain or blockless distributed ledger, respectively, for the second reading to result with an additional first blockchain or blockless distributed ledger, respectively, for the first reading result. Accordingly, different access rights can be easily enabled and the management of the blockchains can be in the hands of different authorities. In particular, these embodiments may be used to verify both whether a supplier of a product was in fact its originator, and whether the supply chain was as expected, or not. In addition, this can be utilized to further increase the achievable security, because the context information can be used to retroactively identify locations or persons being involved in supply chain, where a potential fraud might have happened as well as potential related dates or time frames.

In some further related embodiments, where the storage process relates to blockchains:

(i) storing a respective individual first reading result into a block of a respective blockchain in the first set of blockchains further comprises storing a cross-blockchain pointer which logically maps said block of said blockchain in the first set of blockchains to a corresponding block of a respective blockchain in the second set of blockchains, into said block of said blockchain in the first set of blockchains; and (ii) storing said second reading result in a block of the blockchain in the second set of blockchains further comprises storing a cross-blockchain pointer, which logically maps said block of said blockchain in the second set of blockchains to a corresponding block of a respective blockchain in the first set of blockchains, into said block of said blockchain in the second set of blockchains.

Similarly, in some further related embodiments, where the storage process relates to blockless distributed ledgers:

(i) storing a respective individual first reading result into a node of a respective blockless distributed ledger in the first set of blockless distributed ledgers comprises storing a cross-ledger pointer which logically maps the node of said blockless distributed ledger in the first set of blockless distributed ledgers to a corresponding node of the respective blockless distributed ledger in the second set of blockless distributed ledgers, into the node of said blockless distributed ledger in the first set of blockless distributed ledgers; and (ii) storing said second reading result in a node of the respective blockless distributed ledger in the second set of blockless distributed ledgers further comprises storing a cross-blockchain pointer, which logically maps said node of the respective blockless distributed ledger in the second set of blockless distributed ledgers to a corresponding node of the respective blockless distributed ledger in the first set of blockless distributed ledgers, into said block of said blockless distributed ledger in the second set of blockless distributed ledgers.

In this way, the blockchains or blockless distributed ledgers of the first set of blockchains or blockless distributed ledgers, respectively, can be interconnected by the cross-blockchain pointers or cross-ledger pointers, respectively, to the second set of blockchains or blockless distributed ledgers, respectively, and vice versa. This may be used to further increase the achievable security level of the present object authentication solution. In particular, this can be used to track down attempts of tampering with or counterfeiting objects at different points along a supply chain. For example, this embodiment allows for tracking down a location and/or a point in time of such an attempt.

(c) Selected Embodiments Relating Particularly to Determining Further Initialization Data for a Yet Subsequent Secured Authentication In some further related embodiments, the method further comprises determining a further secured start data package, and optionally further related initialization data for a yet subsequent secured authentication of said physical object or group of physical objects at a yet further recipient thereof. These embodiments relate to one possible variant of enabling one or more yet further subsequent secured authentications of said physical object or group of physical objects by further recipients along a supply chain. In fact, according to this variant, the process described here for is essentially repeated for each next distribution step, i.e. hop, along the supply chain, such that for each such hop new dedicated initialization data is generated and used for the next subsequent authentication at the next recipient. This has the advantage, that the same processes may be reused for multiple hops along the supply chain.

In some related embodiments, determining said further secured start data package (and optionally said further initialization data) comprises issuing a request for determining such further secured start data package (and optionally said further initialization data) for a yet subsequent secured authentication of said physical object or group of physical objects at a yet further recipient thereof to an authorized provider of said further secured start data package (and optionally said further initialization data) and receiving, for example via a blockchain or distributed ledger or other storage, said requested further secured start data package (and optionally said further initialization data) in response to the request. This allows, in particular, for centralizing the determination of further secured start data package (and optionally said further initialization data) for multiple hops along a supply chain at a single entity, thus providing a particularly high efficiency. The central authorized provider may particularly coincide with the entity performing the initial, i.e. first, determination of respective first further secured start data package (and optionally said further initialization data) at the beginning of a supply chain, e.g.

the original manufacturer or distributor of the physical object or objects supplied and authenticated along the supply chain.

In some alternative embodiments, determining said further secured start data package comprises performing the method of the first aspect, such that the predicted context data represents a predicted future location of a further designated next recipient of the physical object or group of physical objects and a related future time of presence of the physical object or group of physical objects at that future location. According to these embodiments, each respective current recipient of the physical object or group of objects determines itself the secured start data package for the respective next recipient, i.e. for the respective next hop, along the supply chain. This has the advantage, that no central authorized entity needs to take care of determining all of the secured start data package for the respective multiple hops along the supply chain and, accordingly, no respective communication links between the recipients and such central authority need to be present.

In some related embodiments, the method further comprises, by performing the method of the first aspect according to related embodiments relating to the determination of initialization data, determining further initialization data based on the same random context data as said further secured start data package and storing or causing said further initialization data to be stored. Therein, the predicted context data represents a predicted future location of a further designated next recipient of the physical object or group of physical objects and a related future time of presence of the physical object or group of physical objects at that future location. Accordingly, according to these embodiments, instead of reusing the previously existing secure start data package, a new secure start data package generated is used for at least the next subsequent authentication. Optionally, even a new (i.e. further) initialization data is determined, e.g. based on new random context data. These various measures may further increase, alone or in combination, the achievable security level, because the entropy of the overall authentication process is further increased.

(d) Object Authentication System

A fourth aspect of the present invention relates to an object authentication system being adapted to perform the method of the third aspect, preferably according to any one or more of its embodiments described herein.

In some embodiments the object authentication system is further adapted to perform the method of the first aspect.

(e) Computer Program

A fifth aspect of the present invention relates to a computer program comprising instructions, which when executed on one or more processors of an object authentication system, such as that according to the fourth aspect, causes it to perform the authentication method according to the third aspect of the present invention.

3. Method and System for Securely Providing a Time-Variant Combination Scheme

A sixth aspect of the present invention relates to a method of securely providing a time-variant combination scheme for authenticating a physical object or group of physical objects according to the authentication method of the third aspect, comprising: (i) Receiving and storing data representing a predetermined combination scheme, a time and location-invariant information identifying or being otherwise specifically related to the said physical object or group of physical objects, and metadata defining a limited validity period of the combination scheme CS; (ii) Receiving a request for the combination scheme and identity information identifying or being otherwise specifically related to a physical object or group of physical objects from a requesting system; (iii) Authenticating the requesting system, e.g. by way of a two-factor authentication scheme; and (iv-1) If the requesting system is successfully authenticated as being authorized and according to previously stored metadata corresponding to the received identity information, the related combination scheme to which the metadata pertains is still valid, outputting data representing that related combination scheme over a data channel being secured against interception to the requesting system; and (iv-1) otherwise, denying the request.

In this way one or more of the combination schemes being used in the methods and systems of the other aspects of the present invention may be securely provided to the relevant nodes (requesting systems) along the supply chain, which have a need to authenticate the physical objects or groups of physical objects. In particular, this allows for using one or more time-variant combination schemes with limited validity periods for such authentications, which may be used to further increase the achievable security level of the overall authentication solution.

Further aspects relate to a system and a computer program, respectively, for performing the method of the sixth aspect.

Each of the computer programs described herein may in particular be implemented in the form of a data carrier on which one or more programs for performing the method are stored. Preferably, this is a data carrier, such as a CD, a DVD or a flash memory module. This may be of advantage, if the computer program product is meant to be distributed as an individual product independent from the processor platform on which the one or more programs are to be executed. In another implementation, the computer program product is provided as a file on a data processing unit, in particular on a server, and can be downloaded via a data connection, e.g. the Internet or a dedicated data connection, such as a proprietary or local area network.

BRIEF DESCRIPTION OF THE DRAWINGS

Further advantages, features and applications of the present invention are provided in the following detailed description and the appended figures, wherein.

In the figures, dashed lines and contours are used to illustrate further, optional, variants of the respective systems and methods. Furthermore, same reference signs in different figures relate to the same or corresponding features. It is to be understood, that the figures merely describe specific embodiments and that one or more features or steps described therein may be in fact optional, even if not marked by dashed lines or being explicitly described as "optional".

DETAILED DESCRIPTION OF PREFERRED EMBODIMENTS

Figure 1:
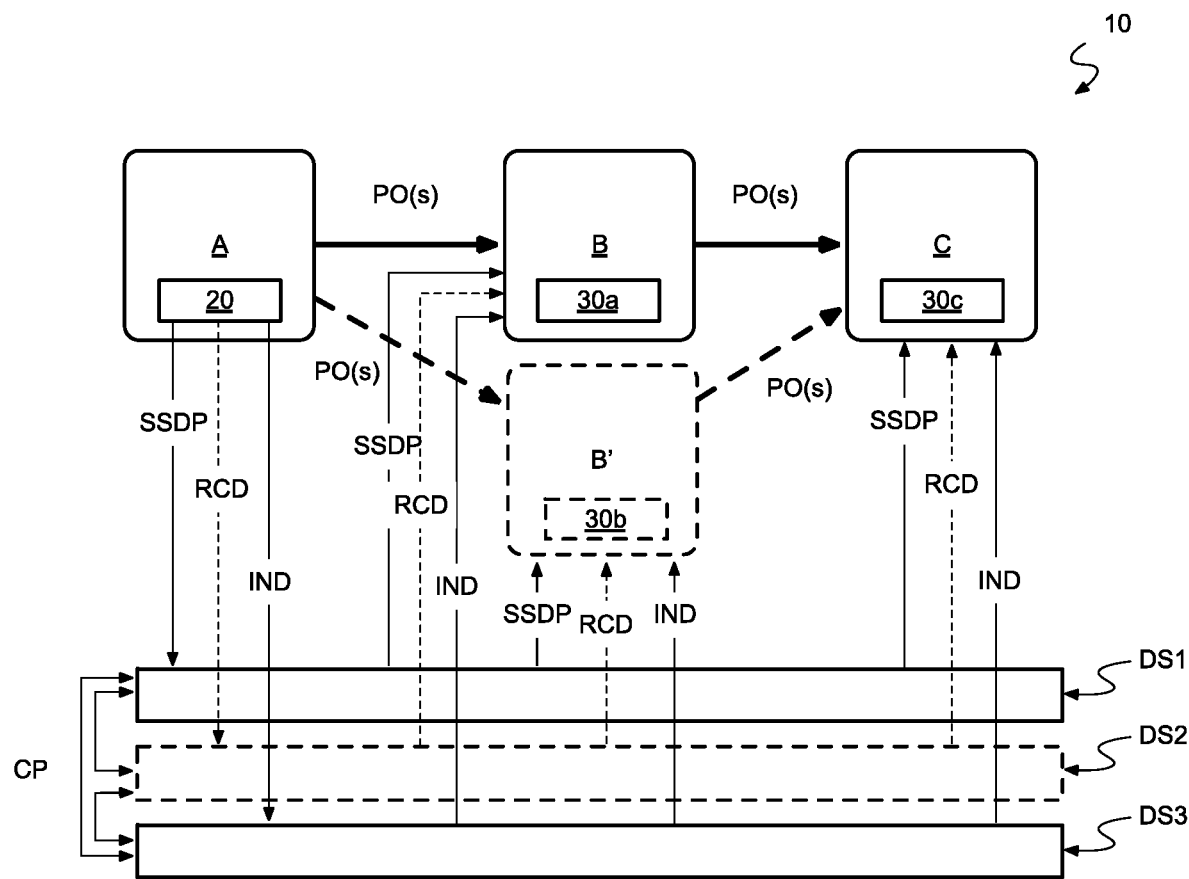
FIG. 1 schematically illustrates an exemplary system overview of an overall security solution comprising respective preferred embodiments of various aspects of the present invention.

FIG. 1 schematically illustrates an exemplary system overview of an overall security solution 10 relating to a supply chain having nodes A, B and C and optionally further node B'. For example, A may relate to an original product manufacturer supplying a physical object PO or group of physical objects POs, hereinafter collectively referred to as PO(s), is a product or group of products, respectively. In principle, this may be any sort of product(s), and particularly these products may be pharmaceuticals or medical devices. Accordingly, the present invention is substantially independent from the sort of physical objects to which it is applied. Node B may be a logistics site, such as a warehouse, of an intermediate wholesaler, and C may be a point of sales, e.g. a shop, where the PO(s) distributed along the supply chain are eventually sold to end customers. The further node B' may commercially belong to B and may for example be an alternative warehouse being located remote from B, such that B may choose to have the PO(s) delivered by A either to warehouse B or to warehouse B'.

At the beginning of the supply process, supplier A uses a preparation system 20, which may particularly comprise a computer and means to issue a challenge to a PUF pertaining to the PO(s) and one or more sensors to detect a response generated by the PUF in reaction to the challenge. Alternatively or in addition, preparation system 20 may comprise a camera system configured to create one or more images of the PO(s) and to send them to an object recognition system that is configured to recognized the PO(s) based on said one or more images and to return a respective recognition result comprising at least one discriminating characteristic of said PO(s) to preparation system 20, for example as described in detail in the European Patent Application EP 18 170 044.4.

The preparation system 20 is configured to perform the method illustrated in FIG. 2 in combination with FIG. 3 or FIG. 4. As will be described in detail below with reference to these figures, preparation system 20 generates, while performing these methods, a secure start data package SSDP and stores it or causes it to be stored into a first data storage DS1. Optionally, preparation system 20 also generates and encrypts and preferably also digitally signs random context data RCD and stores it or causes it to be stored in a second data storage DS2. In addition, preparation system 20 generates initialization data IND and stores it into a third data storage DS3. The three data storages DS1, DS2 and DS3 may be separate data storages or two of them or even all three may be the same. Specifically, each of the data storages may be implemented for example and without limitation as a blockchain or block less distributed ledger or as a storage in a public-key infrastructure PKI. Specifically, the various data entries stored in the data storages may be cross-linked by one of more cross-pointers CP, e.g. in the case of blockchains, by cross-blockchain pointers each connecting two corresponding blocks of a specific pair of blockchains.

Each of the further nodes B, B' and C comprises a respective authentication system 30a, 30b and 30c, respectively. Each of these authentication systems 30a, 30b and 30c is configured to perform the authentication method of FIG. 5 and/or FIG. 6. As will be described in detail below with reference to these figures, a respective system 30a, 30b or 30c performing authentication of received PO(s) reads the secure start data package from the first data storage DS1 and initialization data IND from the third data storage DS3. Then, the authentication is performed based on these reading results.

Figure 2A:
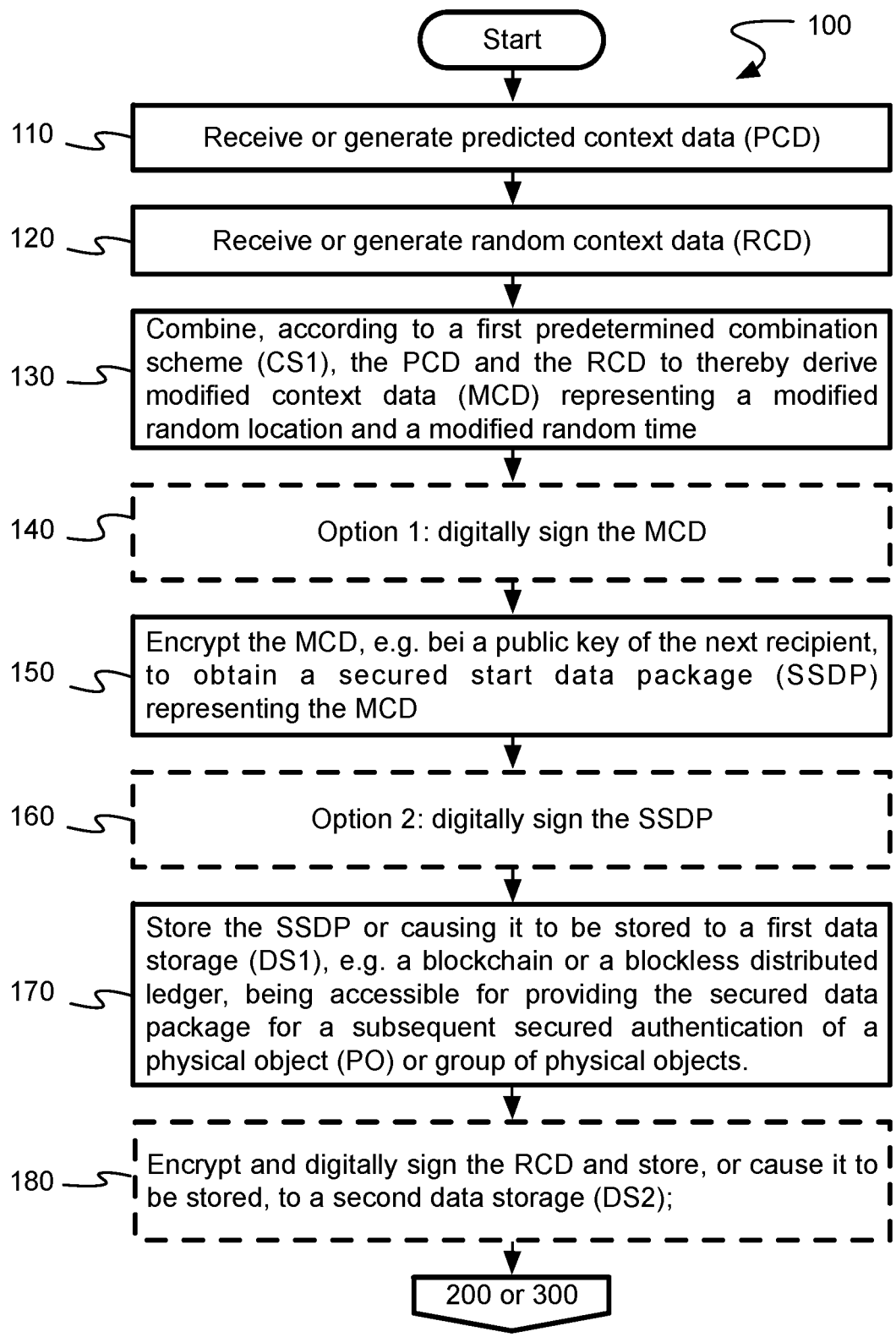
FIGS. 2A and 2B show a flowchart illustrating a preferred embodiment of a first phase of a method of preparing a subsequent secured authentication of a physical object or group of physical objects by a recipient thereof according to the present invention.
Figure 2B:
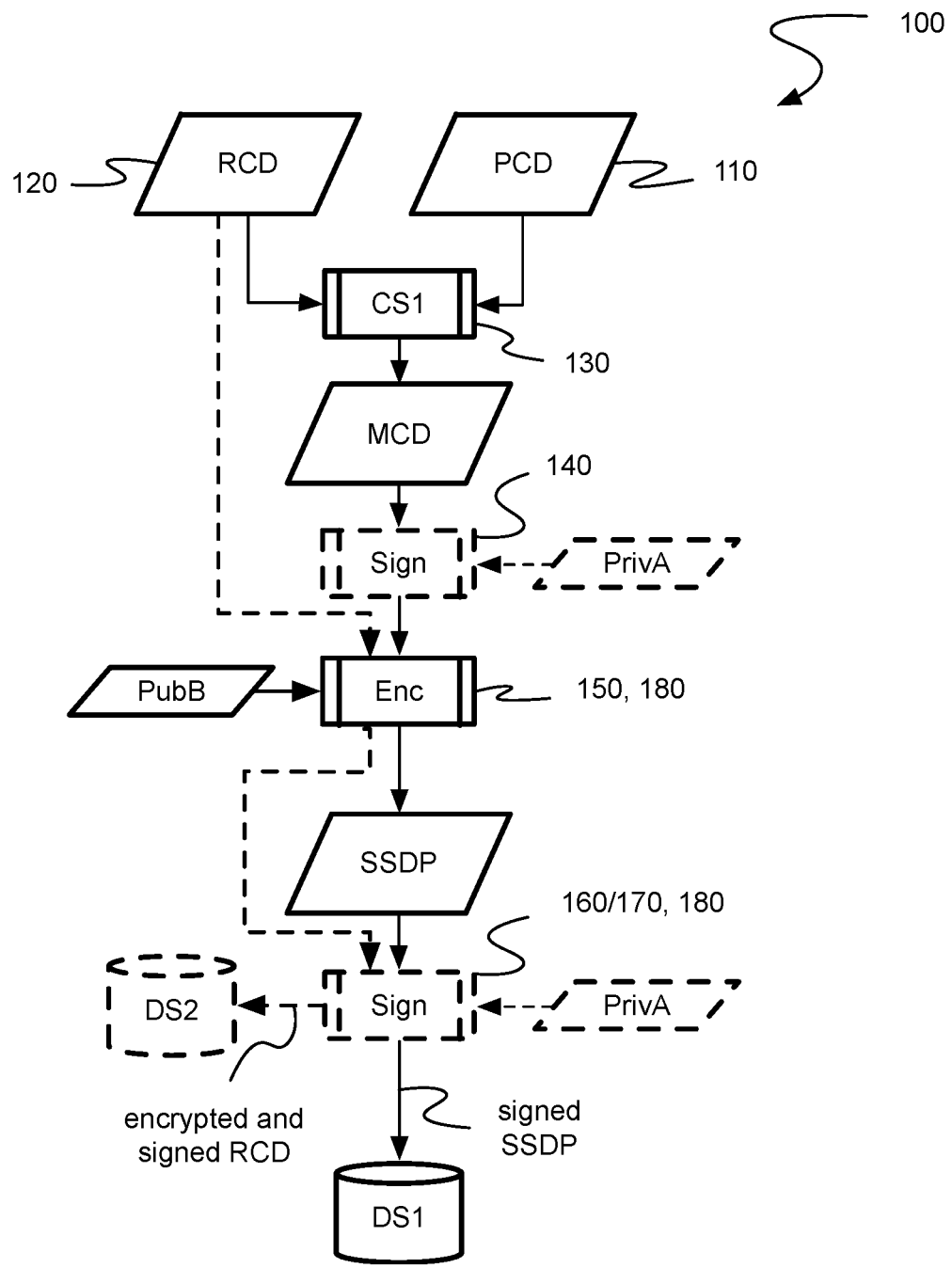

FIG. 2A shows a flowchart illustrating a preferred embodiment of a first phase 100 of a method of preparing a subsequent secured authentication of a physical object or group of physical objects by a recipient thereof according to the present invention. In particular, the case of supply chain, this method is preferably performed at the beginning of the supply chain by the first node thereof. In the present example of FIG. 1, this is node A, respectively its preparation system 20 and accordingly, the below description is based on this non-limiting example. FIG. 2B shows a compact form of the same method of FIG. 2A, but in the more compact form of a data flow chart.

In a step 110, the preparation system 20 receives from another entity, such as a central logistic center, or generates itself predicted context data PCD relating to the next node along the supply chain, i.e. in the present example, node B. The predicted complex data PCD represents the location $x_B$ of node B, or more specifically of its system 30a, and a predicted time $t_B$, at which the PO(s) are expected to arrive at B. The predicted context data PCD may particularly be derived from logistics planning data, such as a delivery schedule, for the supply chain. The precision of the predicted context data (e.g. in terms of geocoordinate range, and units of time, e.g. hours or days or weeks) is preferably adapted to match the precision with which a future location and corresponding point in time at which the authentication of the PO(s) at the next node of the supply chain, i.e. in the present example, node B, is to happen, can be reliably predicted. For example, if according to current logistics planning data, the PO(s) are scheduled to arrive at node B on a particular date, and node B relates to industrial premises having a spatial extension of roughly 500 m×500 m, the PCD may be defined with a time-wise precision of a day (24 h) and the location-wise precision of ±500 m.

In a further step 120, preparation system 20 receives from another entity, such as said central logistics center or an external computer, or generates itself random context data RCD representing a random location $x_r$ and a random time $t_r$.

Then, in a step 130, the PCD and the RCD are combined according to a first predetermined combination scheme CS1 to thereby derive modified context data MCD representing a modified random location $x_m$ and a modified random time $t_m$. The first predetermined combination scheme CS1 may be a time-invariant scheme that needs to be set and made available to each of the nodes of the supply chain, where the PO(s) are to be authenticated, only once. Alternatively, CS1 may be time-variant, which further increases the entropy of the security solution and thus the achievable security level. An example of using a time-variant combination scheme CS1 according to embodiments of the present invention will be provided below in connection with the discussion of FIG. 7.

Each of the RCD and the PCD may optionally represent further information in addition, although this is not required for the present method. In a further step 150, the modified context data MCD is encrypted, for example by a public key PubB of the next recipient B, to obtain a secured start data package SSDP representing the MCD.

In addition, the MCD may be digitally signed by the sending node, i.e. in the present example node A, with a digital signature pertaining to A. The signature step may be performed either (i) before the encryption according to step 140 (option 1), or (ii) after the encryption in a step 160 (option 2), wherein instead of the original MCD the SSDP resulting from the encryption of the MCD is digitally signed by A with its private key PrivA. Then, in a step 170 that completes the first phase 100, unless an optional further step 180 is applied, the SSDP is stored or caused to be stored by another entity, such as an external computer, to the first data storage DS1, as described above with reference to FIG. 1.

Optional step 180 relates to a specific embodiment discussed below in detail with reference to FIG. 8. In this embodiment, the random context data is stored in a third data storage DS3 to enable another node in the supply chain to take over the role of node A at a later time, for example at a time when A is no longer available for the supply chain, even if that other node has not stored itself the random context data RCD recovered during a previous authentication process, e.g. according to FIG. 5A/5B or FIG. 6A/6B.

Figure 3A:
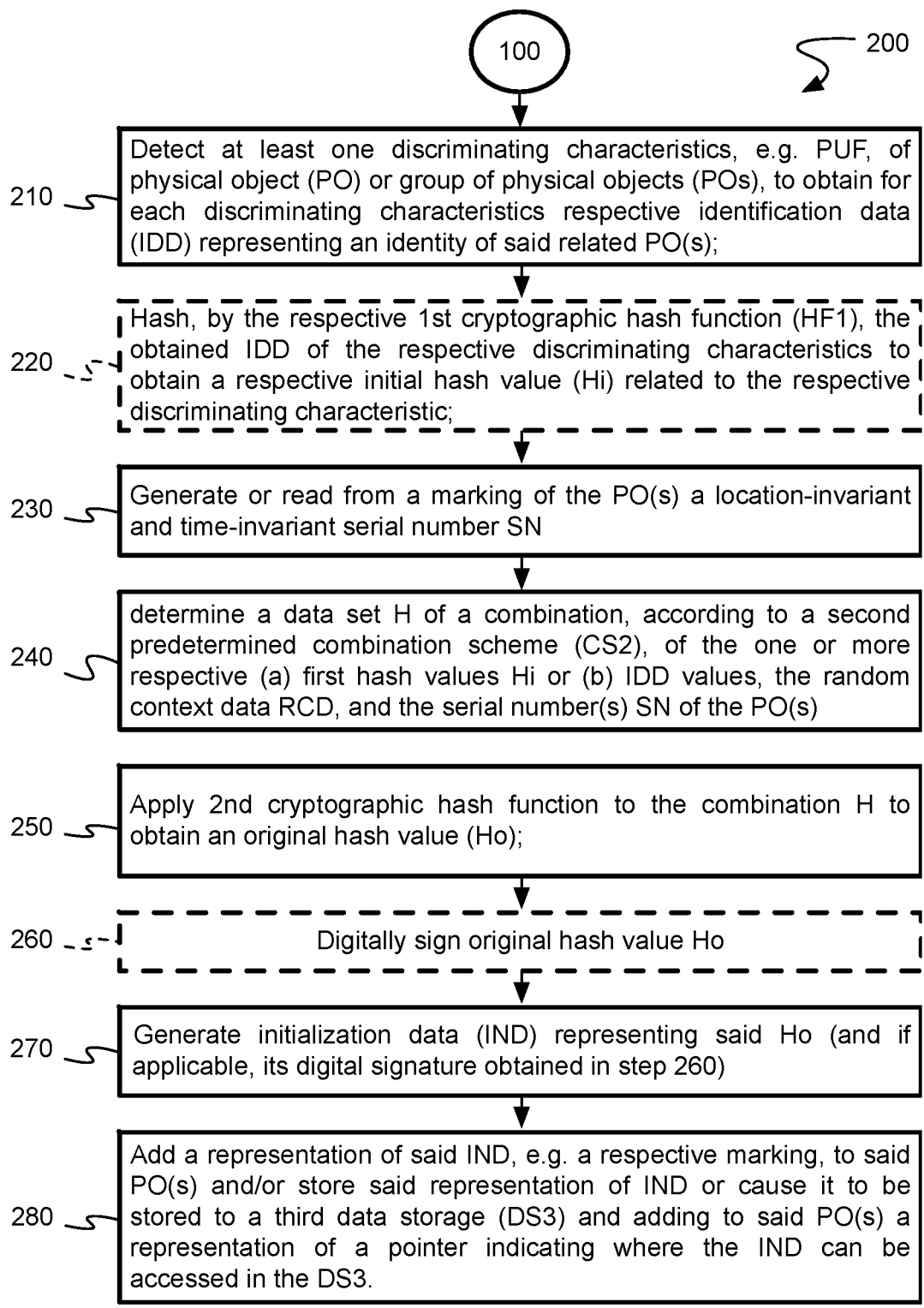
FIGS. 3A and 3B show a flowchart illustrating a preferred first embodiment of the second phase of the method of preparing a subsequent secured authentication according to the present invention.
Figure 3B:
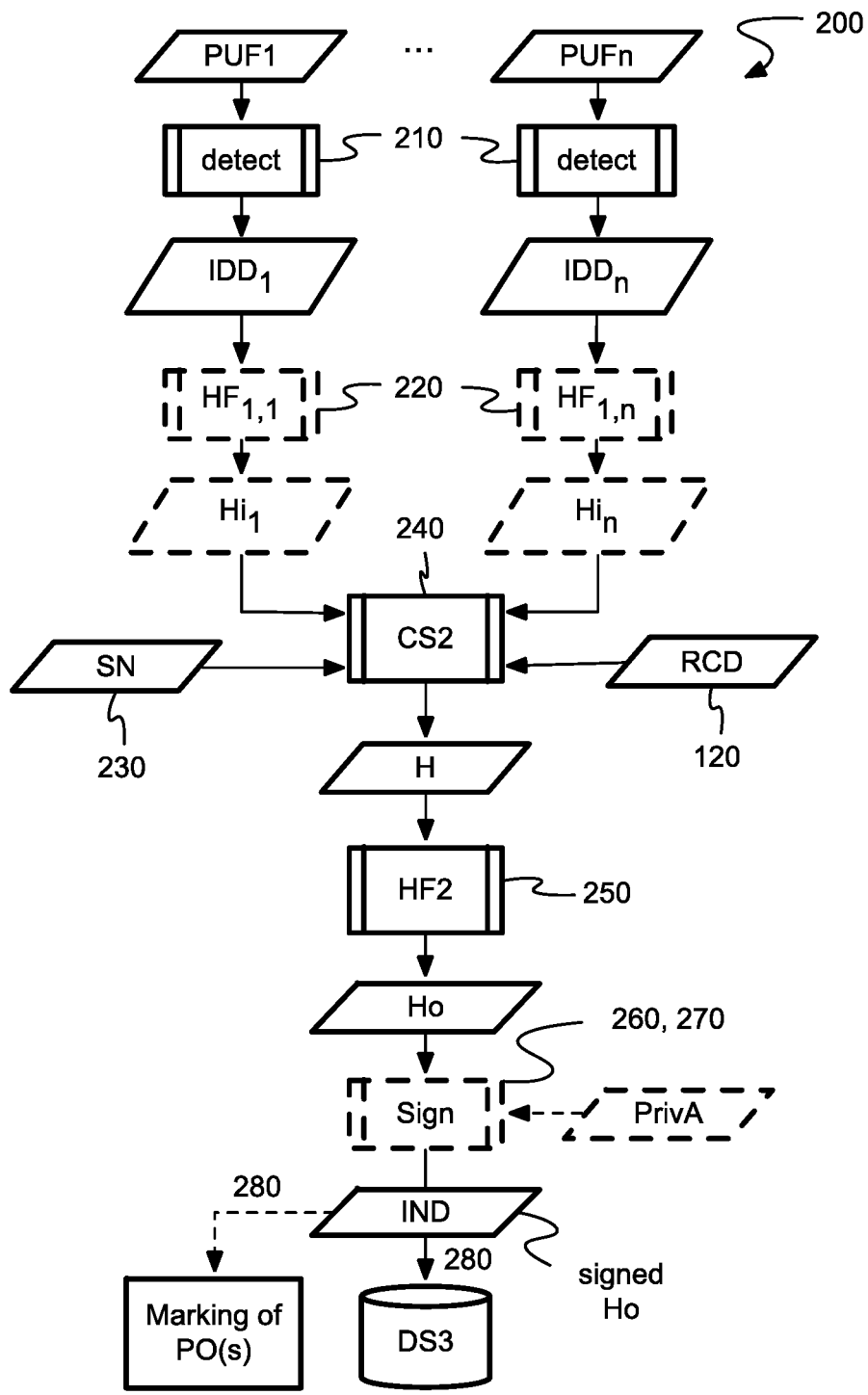

FIG. 3A shows a flowchart illustrating a preferred first embodiment 200 of the second phase of the method of preparing a subsequent secured authentication according to the present invention. FIG. 3B shows a corresponding data flow chart. Specifically, this first embodiment relates to the case, where the PO(s) to be authenticated along the supply chain have or bear themselves a number n=1, 2, 3, . . . of specific discriminating characteristics, which may each be particularly a Physical Unclonable Function PUF, for example according to one or more of the PUF types described above.

In a step 210 of the second phase 200 of the method, preparation system 20 detects the n discriminating characteristics, in the present example PUFs, of the PO(s) to be authenticated along the supply chain to obtain for each discriminating characteristic respective identification data IDD representing an identity of said related PO(s).

Then, in an optional step 220, for each of the discriminating characteristics k□{1, . . . , n}, a respective first cryptographic hash function $HF_{1,k}$ is applied to the obtained $IDD_k$ of the respective discriminating characteristic k to obtain a respective initial hash value $Hi_k$ related to this particular discriminating characteristic k. The respective first cryptographic hash functions $HF_{1,k}$ related to different discriminating characteristics or IDDs, respectively, may be either equal or different. It is also possible that some of them are equal while others are different, as long as the relationship between a particular discriminating characteristic/IDD and a respective first hash function $HF_{1,k}$ remains known and unchanged. In case optional step 220 is omitted, the obtained $IDD_k$ take the role of the corresponding initial hash value $Hi_k$ and thus form themselves inputs to the subsequent combination step 240, described below.

In a further step 230, preparation system 20 reads from the PO(s), for example from a respective marking thereon, location-invariant and time-invariant information relating specifically to the PO(s). For example, the information may comprise one or more serial numbers being assigned to the PO(s). Alternatively, particularly if such information does not exist yet, preparation system 20 may itself generate such location-invariant and time-invariant information and assign it to the PO(s) at question. In the present non-limiting example, the location-invariant and time-invariant information shall be one or more serial numbers assigned to the respective PO(s). Herein, the serial numbers are collectively referred to as SN.

In a yet further step 240, if n>1, the n initial hash values $H_1, \ldots, H_t$ (if step 220 is implemented) or values $IDD_1, \ldots, IDD_n$ (if step 220 is not implemented) are combined with the random context data RCD and the serial number(s) SN according to a second combination scheme CS2 resulting in a data set H (which may for example be only a single value H) representing the result of this combination operation. Preferably, the combination scheme CS2 is information-conserving and/or ideally entropy-conserving. For example, the data set resulting from the combination according to combination scheme CS2 may take the form of a mere data aggregation of the respective input data, i.e. the values to be combined. The aggregation may particularly be represented by a single-dimensional or multi-dimensional matrix or other type of array. Like the first combination scheme CS1, also the second combination scheme CS2 may be a time-invariant scheme that needs to be set and made available to each of the nodes of the supply chain, where the PO(s) are to be authenticated, only once. Alternatively, again like CS1, it may be also be time-variant, wherein each of the nodes of the supply chain then needs to be informed about the respective applicable second combination scheme CS2, in order to enable the respective authentication of the PO(s) at that node. An example of using time-variant combination schemes CS1 and/or CS2 according to embodiments of the present invention will be provided below in connection with the discussion of FIG. 7.

Then, in a step 250, a further hash value Ho, which will be referred to herein as "original hash value", is generated by applying a second cryptographic hash function to the data set H.

In a further step 260, preparation system 20 digitally signs the original hash value Ho with the private key PrivA of A in order to allow a subsequent verification of the origin of Ho in a subsequent authentication at a node in the supply chain, i.e. in the present example at nodes B, B' and C.

In a yet further step 270, which may particularly be implemented together with step 260 as a single combined step, preparation system 20 generates initialization data IND representing the original hash value Ho obtained in step 250 along with the digital signature thereof obtained in step 260.

Phase 200 of the method is concluded by a further step 280, wherein a representation of the initialization data IND, e.g. a respective marking, is added to said PO(s) and/or said representation of IND is stored or caused to be stored to a third data storage DS3 along with adding to said PO(s) a representation of a pointer indicating where the IND can be accessed in DS3. The storage location for the IND within DS3 and therefore also the pointer may, for example, be determined based on the one or more serial numbers SN of the PO(s).

Figure 4A:
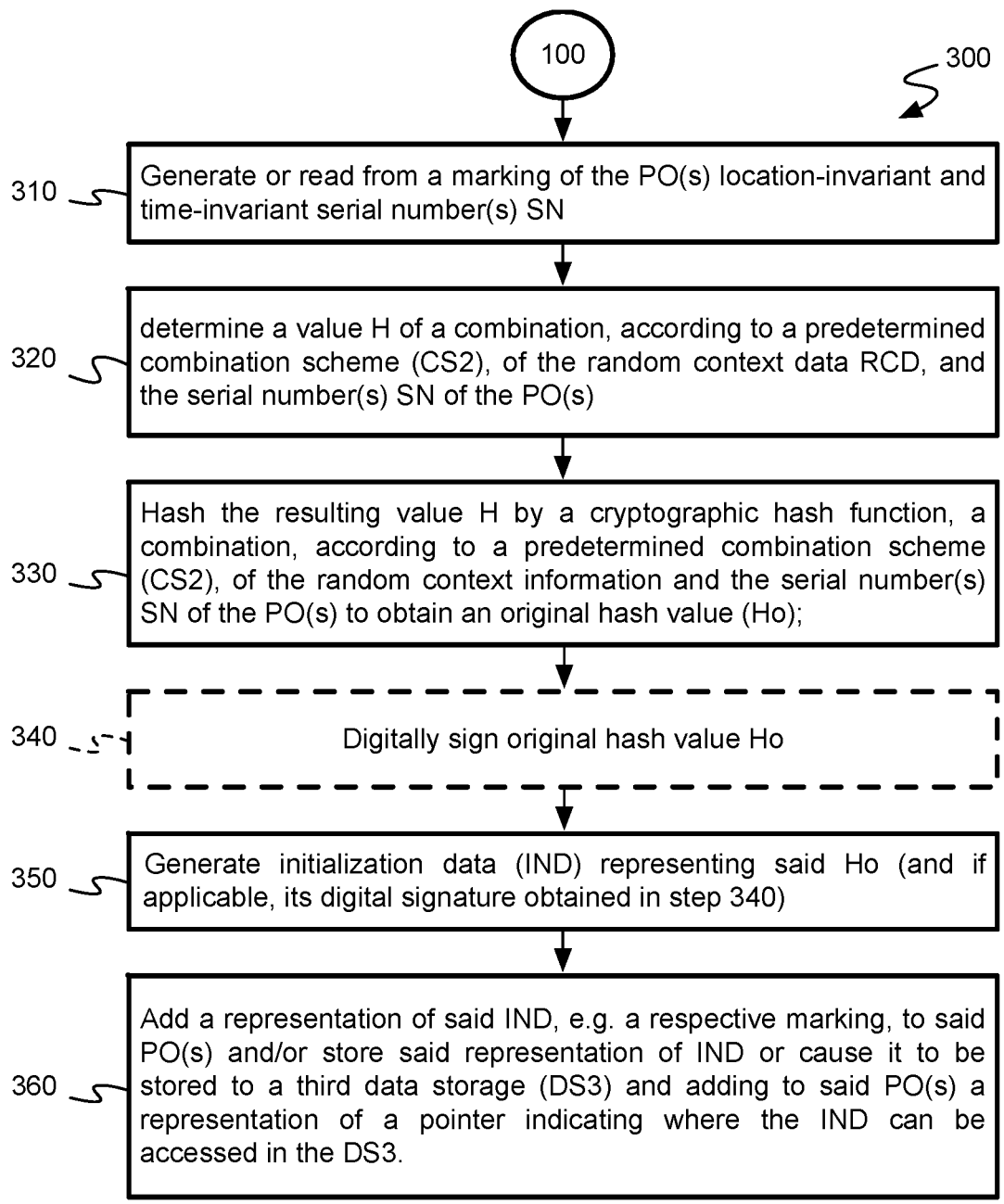
FIGS. 4A and 4B show a flowchart illustrating a preferred second embodiment of the second phase of the method of preparing a subsequent secured authentication according to the present invention.
Figure 4B:
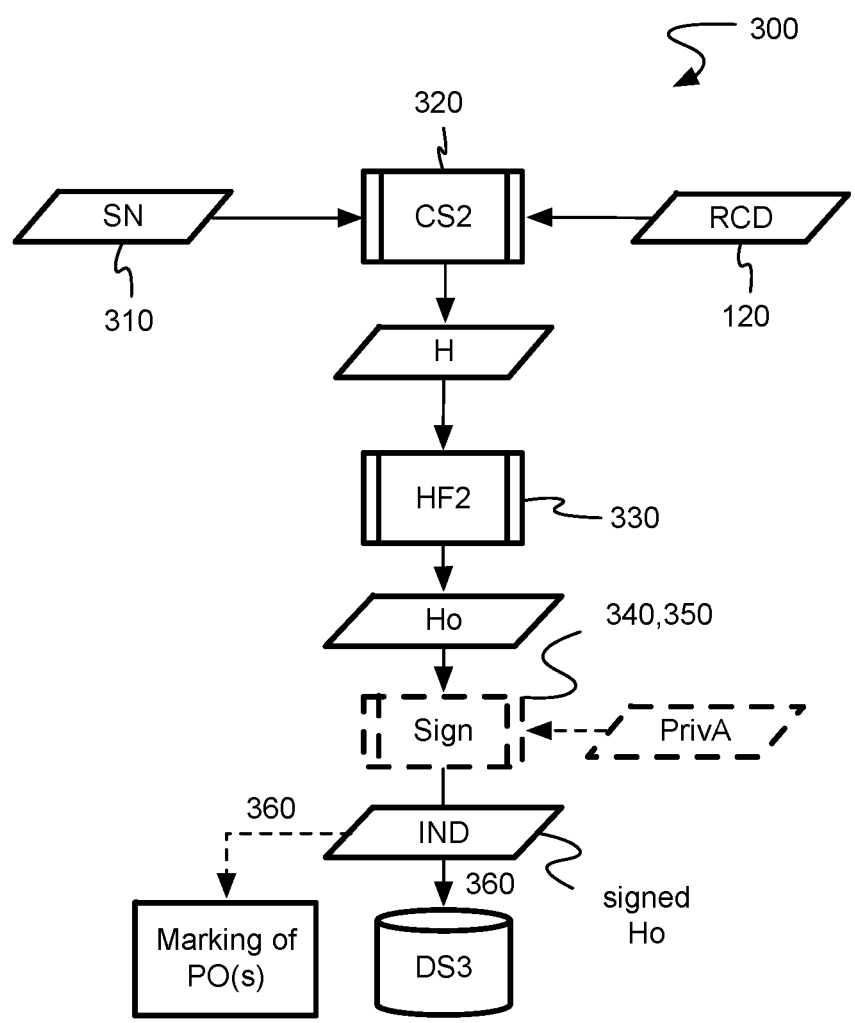

FIG. 4A shows a flowchart illustrating a preferred second embodiment 300 of the second phase of the method of preparing a subsequent secured authentication according to the present invention. FIG. 4B shows a corresponding data flow chart. Specifically, this second embodiment relates to the case, where the PO(s) to be authenticated along the supply chain may not have or bear themselves a specific discriminating characteristic, such as for example a Physical Unclonable Function PUF.

In a step 310, which is equal to step 230 in FIG. 2A/2B, preparation system 20 reads from the PO(s) or generates itself location-invariant and time-invariant information relating specifically to the PO(s), for example one or more serial numbers SN being assigned to the PO(s).

In a yet further step 320, preparation system 20 determines a data set H of a combination, according to a predetermined combination scheme CS3, of the random context data RCD and a time and location-invariant information identifying or being otherwise specifically related to the PO(s). For example, this information may be one or more serial numbers SN of the PO(s). Like CS2, the combination scheme CS3 may be a time-invariant scheme or a time-variant scheme (see FIG. 7).

In a yet further step 330 preparation system 20 generates an original hash value Ho by applying a cryptographic hash function to the obtained data set H.

In a yet further (optional) step 340, preparation system 20 digitally signs the original hash value Ho with the private key of A in order to allow a subsequent verification of the origin of Ho in a subsequent authentication at a node in the supply chain, i.e. in the present example at nodes B, B' and C.

In a yet further step 350, which may particularly be implemented together with step 340 as a single combined step, preparation system 20 generates initialization data IND representing the original hash value Ho obtained in step 320, along with the digital signature thereof obtained in step 330, if implemented.

Phase 300 of the method is concluded by a further step 360, wherein a representation of the initialization data IND, e.g. a respective marking, is added to said PO(s) and/or said representation of IND is stored or caused to be stored to a third data storage DS3 along with adding to said PO(s) a representation of a pointer indicating where the IND can be accessed in DS3. The storage location for the IND within DS3 and therefore also the pointer may, for example, be determined based on the one or more serial numbers SN of the PO(s).

Figure 5A:
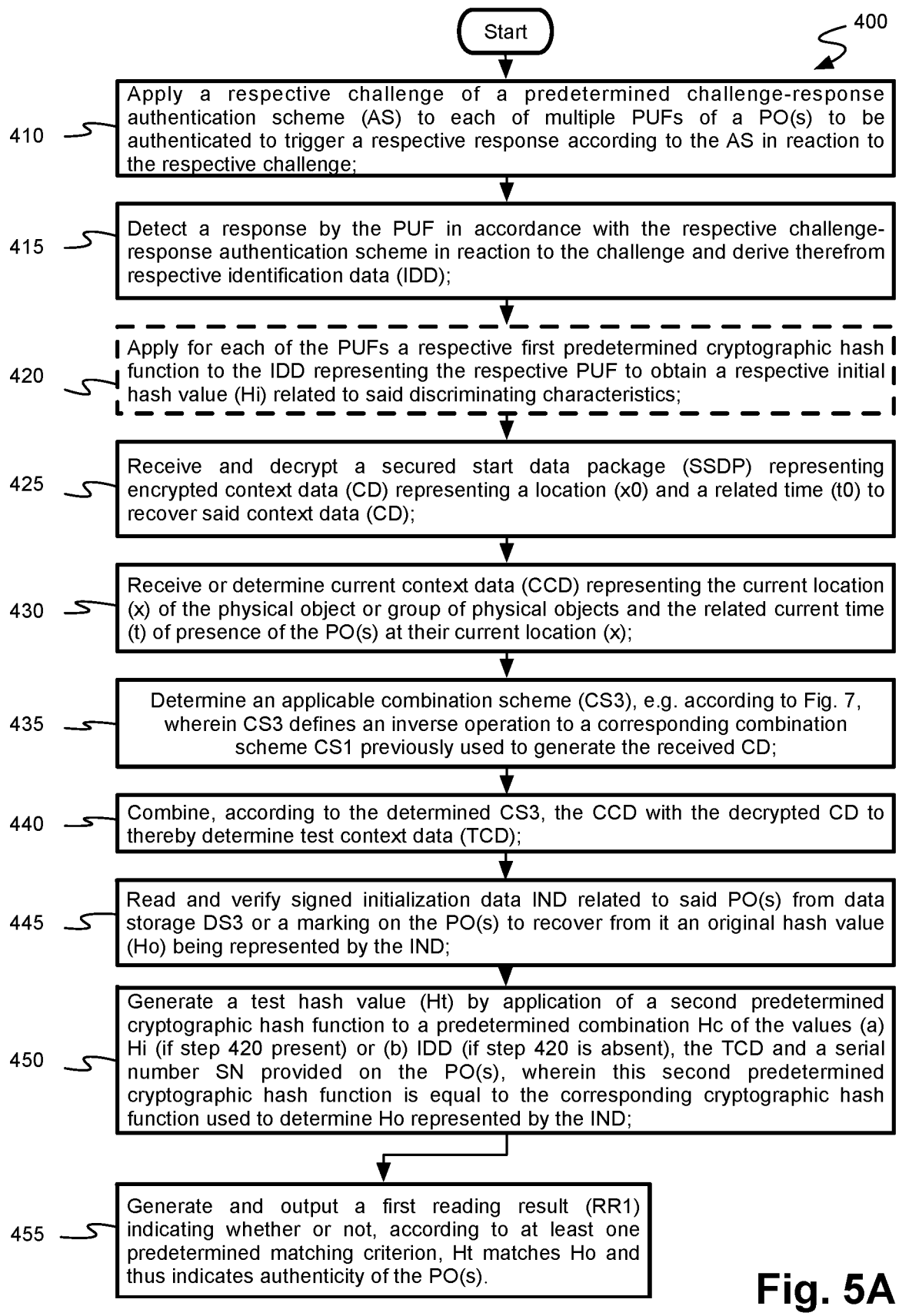
FIGS. 5A and 5B show a flowchart illustrating a preferred first embodiment of a method of authenticating a physical object or group of physical objects according to the present invention, which is configured to be used in connection with the method of FIGS. 2 and 3.
Figure 5B:
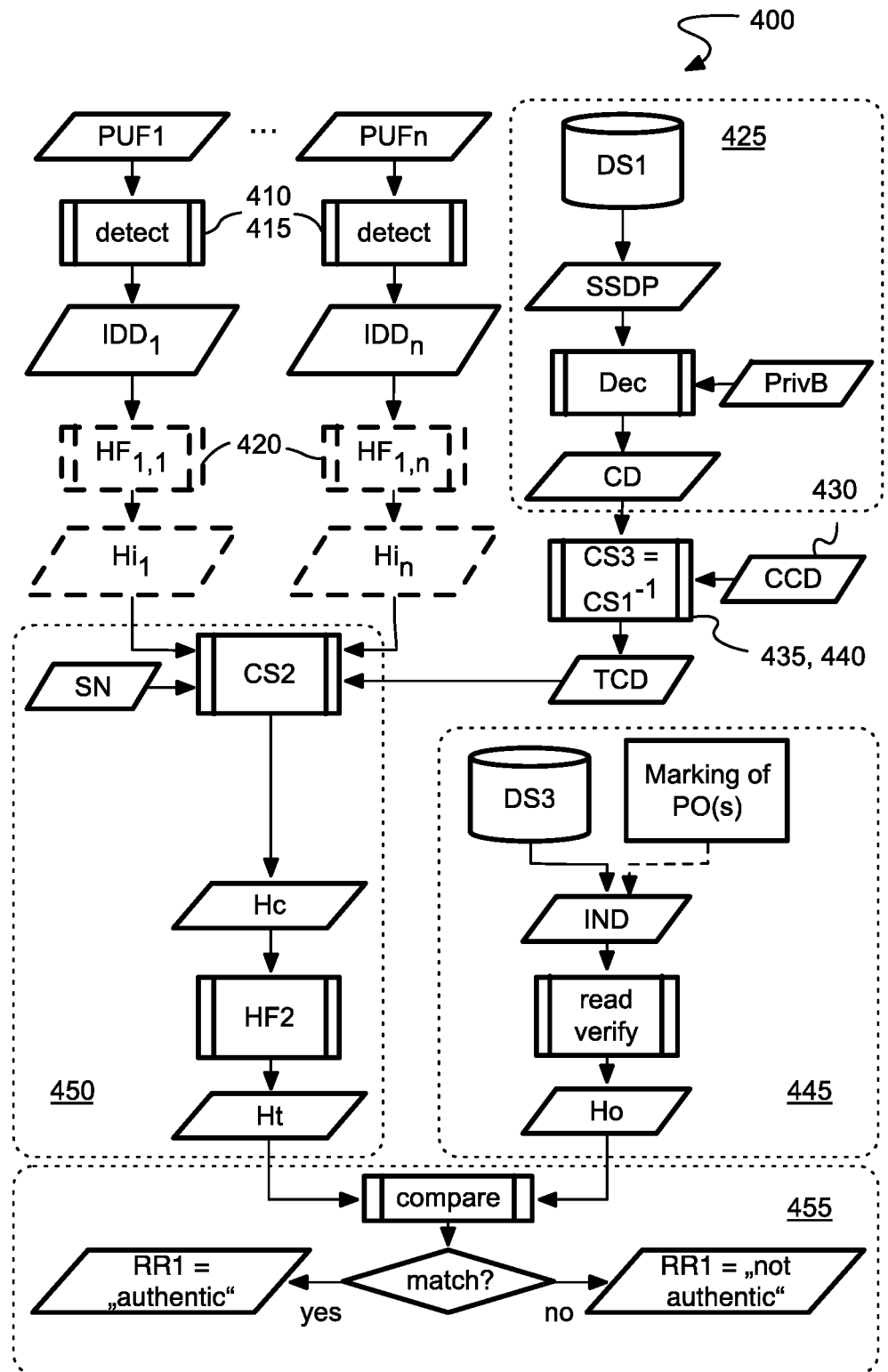

FIG. 5A shows a flowchart illustrating a preferred first embodiment 400 of a method of authenticating a physical object or group of physical objects according to the present invention, which is configured to be used in connection with the method of FIGS. 2 and 3. FIG. 5B shows a corresponding data flow chart.

The method 400 is designed to be used in particular by those nodes B, B', C along the supply chain which are not the starting point A of the distribution of the PO(s) and which thus have a desire to properly authenticate the PO(s) received from the respective immediately preceding node in the supply chain. The method will now be explained exemplarily in relation to PO(s) which bear two or more different PUFs as discriminating characteristics. Of course, similar methods based on other, non-PUF discriminating characteristics or a mix of PUF and non-PUF discriminating characteristics may be used instead, according to further embodiments not illustrated herein.

Method 400 comprises a step 410, wherein the respective authentication system 30a, 30b or 30c, which performs the method, applies to each of the PUFs of the PO(s) to be authenticated a respective challenge of a respective predetermined challenge-response authentication scheme AS to trigger a response according to the AS in reaction to the challenge. For simplification, the following description in FIGS. 5A,B and 6A,B will focus on authentication system 30a at node B, although it needs to be understood that the same method 400 may be used by all other nodes along the supply chain as well.

In step 415 each of the responses of the various PUFs is detected in accordance with the respective challenge-response authentication scheme and respective identification data IDD, which represent the response, are being derived therefrom.

In a further (optional) step 420, for each of the PUFs k, a respective first predetermined cryptographic hash function $HF_{1,k}$ being equal to the corresponding first cryptographic hash function that was previously used in the method of FIG. 3 during the preparation phase 200 for the same PUF, is applied to the respective IDD to obtain a respective initial hash value $Hi_k$ related to that $IDD_k$ of PUF k, respectively. Steps 410 to 420 serve to provide the set of initial hash values $Hi_k$ as a first input to a subsequent combination step 450 which will be described below in detail. If step 420 is not implemented, the respect first input to combination step 450 will be instead the corresponding values $IDD_k$ derived in step 415.

Further steps 425 to 440 are designed to provide a second input to combination step 450. In step 425, the considered system 30a, e.g. reads, from the first data storage DS1 a secured start data package SSDP representing encrypted context data CD which in turn represents a location $x_0$ and a related time $t_0$. The SSDP is decrypted to recover said context data CD.

In addition, in a step 430, current context data CCD representing the current location x and the related current time t of presence of the PO(s) at their current location x is generated by system 30a or received from another entity, such as a logistics database. Preferably, the current context data CCD has a similar precision as the predicted context data.

In a further step 435, system 30a determines an applicable combination scheme CS3, which defines an inverse operation with corresponding operation according to the corresponding combination scheme CS1 previously used to generate the received context data CD. This determination may for example be performed as described below with reference to FIG. 7.

Then, in a step 440, the current context data CCD is combined, according to the determined combination scheme CS3, with the decrypted context data CD to thereby determine test context data TCD. This combination operation of step 440 is in effect the inverse operation of the operation performed per step 140 of FIG. 2. When the PCD and the CCD have similar precision, and that precision is matched to the context-wise reliability of the supply chain logistics, the authentication becomes more robust against acceptable differences between the locations and/or particularly the points in time indicated by the PCD and CCD, respectively. Accordingly, if the current context data CCD matches the corresponding PCD, at least within said precision, and the SSDP has not been corrupted, the resulting TCD is expected to match the original random context data RCD.

Further step 445 is designed to provide a third input to subsequent combination step 450. In step 445, system 30*a* reads from data storage DS3 initialization data IND related to said PO(s) that was previously stored in DS3 according to step 340 of method phase 300. If the stored initialization data IND was digitally signed before storing it, reading the initialization data IND comprises verifying the respective digital signature by which the IND was digitally signed and recovering the original hash value Ho represented by the initialization data IND. Ho is then available as said third input to combination step 450, which follows.

In said combination step 450, system 30*a* generates a test hash value Ht by application of a second predetermined cryptographic hash function to a predetermined combination Hc of the initial hash values $Hi_k$, the TCD and one or more serial numbers SN provided on the PO(s). The second predetermined cryptographic hash function is equal to the corresponding cryptographic hash function HF2 used to determine Ho, as represented by the IND, in step 230 of method phase 200.

Finally, method 400 is concluded by step 455, wherein authentication system 30*a* generates and outputs a first reading result RR1 indicating whether or not, according to at least one predetermined matching criterion, HT matches Ho and thus indicates authenticity of the PO(s).

Figure 6A:
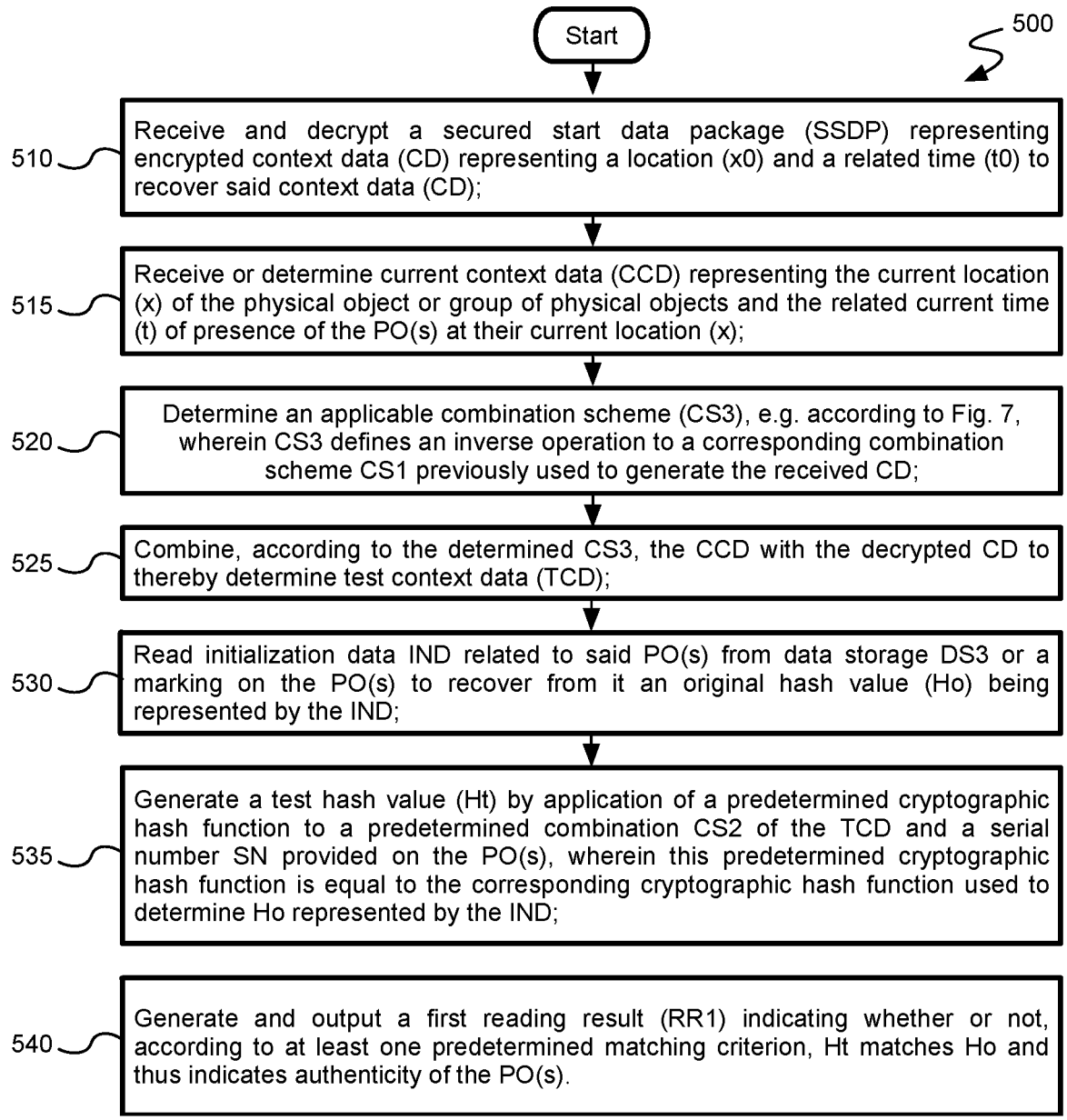
FIGS. 6A and 6B show a flowchart illustrating a preferred second embodiment of a method of authenticating a physical object or group of physical objects according to the present invention which is configured to be used in connection with the method of FIGS. 2 and 4.
Figure 6B:
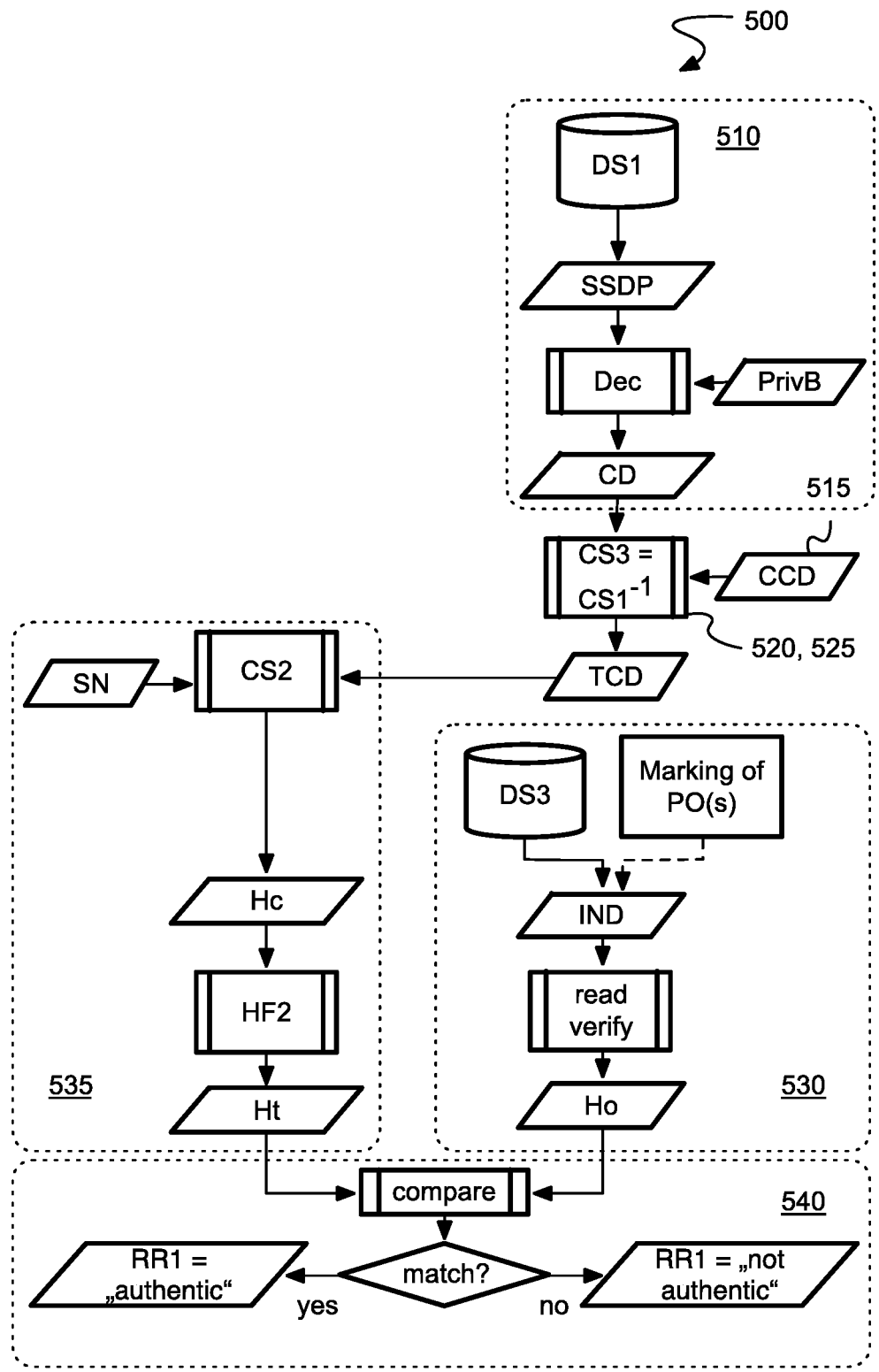

FIG. 6A shows a flowchart illustrating a preferred second embodiment 500 of a method of authenticating a physical object or group of physical objects according to the present invention, which is configured to be used in connection with the method of FIGS. 2 and 4. FIG. 6B shows a corresponding data flow chart.

The second embodiment 500 differs from the first embodiment 400 described above in connection with FIG. 5 in that no discriminatory characteristics of the PO(s) are available or being used.

Accordingly, in method 500, there are on the one hand no steps corresponding to steps 410 to 420 of method 400, while on the other hand there are steps 510 to 530, which correspond to and may particularly be identical to steps 425 to 445. Further step 535 of method 500 differs from corresponding step 450 of method 400 in that now the test hash value Ht is generated by application of a respective cryptographic hash function HF2 to a predetermined combination Hc of the test context data TCD and the one or more serial numbers SN provided on the PO(s). The final output step 540 of method 500 is again identical to step 455 of method 400.

While the embodiment of method 400 (and method 200) may be used to achieve higher security levels than those that are available when using method 500 (and method 300), the latter has the advantage of lower complexity and may thus be preferable, when in view of a moderate desired security level keeping the complexity and thus costs and efforts for implementing the system low has priority.

Figure 7:
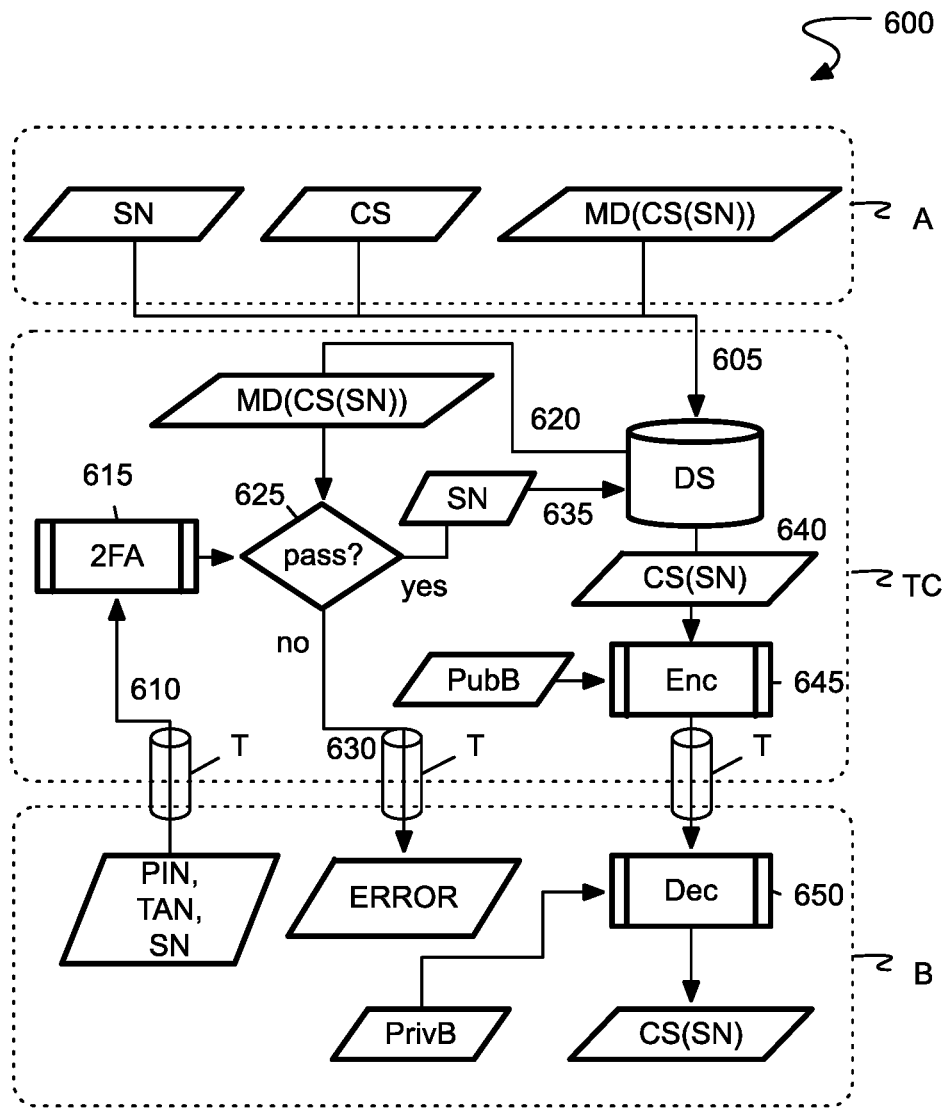
FIG. 7 shows a flowchart illustrating a preferred embodiment of a method of using one or more a time-variant combination schemes in connection with the methods of FIGS. 3A/3B to 6A/6B.

FIG. 7 shows a flowchart illustrating a preferred embodiment of a method 600 of using one or more a time-variant combination schemes in connection with the methods of FIGS. 3A/3B to 6A/6B. When a recipient, such as node B, needs to authenticate a received PO(s), it will first have to recover the applicable time-variant combination schemes CS, such as for example CS2 and/or CS3.

The solution to this problem according to embodiment of FIG. 7 is based on a trusted authority TC, such as for example a trust center as it is known from public key infrastructures (PKI). In another example, the original supplier A may itself be or provide the trust center TC.

During a process of preparing a subsequent authentication, for example in the process according to the methods 100/200 or 100/300 described above with reference to FIG. 2 and FIGS. 3A/3B, or FIG. 2 and FIGS. 4A/4B, in a step 605, node A stores or causes to be stored into a data storage DS, e.g. DS1, of the trust center TC one or more serial numbers SN and pertaining to a particular PO(s) to be distributed and authenticated along a given supply chain, the relevant combination scheme CS, such as an inversible mathematical formula or another suitable inversible data processing scheme, and metadata MD(CS(SN)) related to the combination scheme CS applicable for the PO(s) with serial number(s) SN. The metadata MD(CS(SN)) may particularly comprise information defining a limited validity period of the combination scheme CS, such that it is no longer applicable once the validity period has expired.

When B receives the PO(s) and needs to authenticate them, it sends in a step 610 a respective request to the trust center TC along with the PO(s)'s serial number(s) SN and predefined identification information that allows for a two factor authentication 2FA, i.e. a further authentication of B by the trust center which is independent from the private key PrivB of B (that is for example used to decrypt the SSDP during the authentication process for the PO(s)). The identification information may for example comprise a PIN and a TAN, similar to known procedures for online banking, a photo TAN, a password or may be based on a further independent public/private key pair.

The trust center TC then verifies in a 2FA-step 615 the identification information received from B in order to authenticate B and also retrieves in a step 620 the meta data MD(CS (SN)) from the data storage DS. In step 625, the meta data MD(CS (SN)) is checked in order to determine if requested combination scheme CS is still valid and the result of the authentication step 615 is evaluated. If this authentication of B and/or check fails (625—no), an error message is returned to B in a step 630. Otherwise (625—yes), the received serial number(s) SN is used in a step 635 as an index to query a database in the data storage DS to retrieve in a step 640 the desired combination scheme CS(SN) and encrypted in a further step 645, e.g. with the public key of B. When B receives the encrypted to combination scheme CS(SN), it decrypted in the step 650, e.g. with its private key, in order to obtain the desired combination scheme CS(SN). While using asymmetric encryption is a suitable approach for implementing the encryption/decryption of steps 645 and 650, any other approach for sufficiently securing the communication between TC and B against interception may instead be used instead. In FIG. 7, the secured communication between B and TC is indicated as a respective secured "tunnel" T which may be separate for each of the communications or a joint tunnel for two or more of the communication links. For example, a symmetric encryption may be used. Also, if asymmetric encryption is used for that purpose, a different pair of keys may be used than in other steps of the methods described above.

In summary, in order for B to successfully authenticate the received PO(s), three conditions (factors) need to be fulfilled: (1) B needs to process his private key PrivB, (2) the authentication needs to take place at the correct location (node B) and timeframe defined by A in the predicted context data PCD during the preparation phase 200, and (3) B needs to have the valid identification information needed to access the relevant one or more time-variant combination schemes CS, e.g. CS2 and/or CS3. Accordingly, the authentication of the PO(s) would fail, if the PO(s) were originally scheduled to arrive at node B at a given time, as defined in the related predicted context data PCD, but the PO(s) were actually provided instead to B's other warehouse location (node B'), i.e. at a different time and to a different location (cf. FIG. 1). Thus, when B wants A to redirect the distribution of PO(s) from mode A to node B' (instead of node B), B needs to inform A of this desire and then A needs to prepare and store an update start data package SSDP reflecting this redirection to node B'.

Figure 8A:
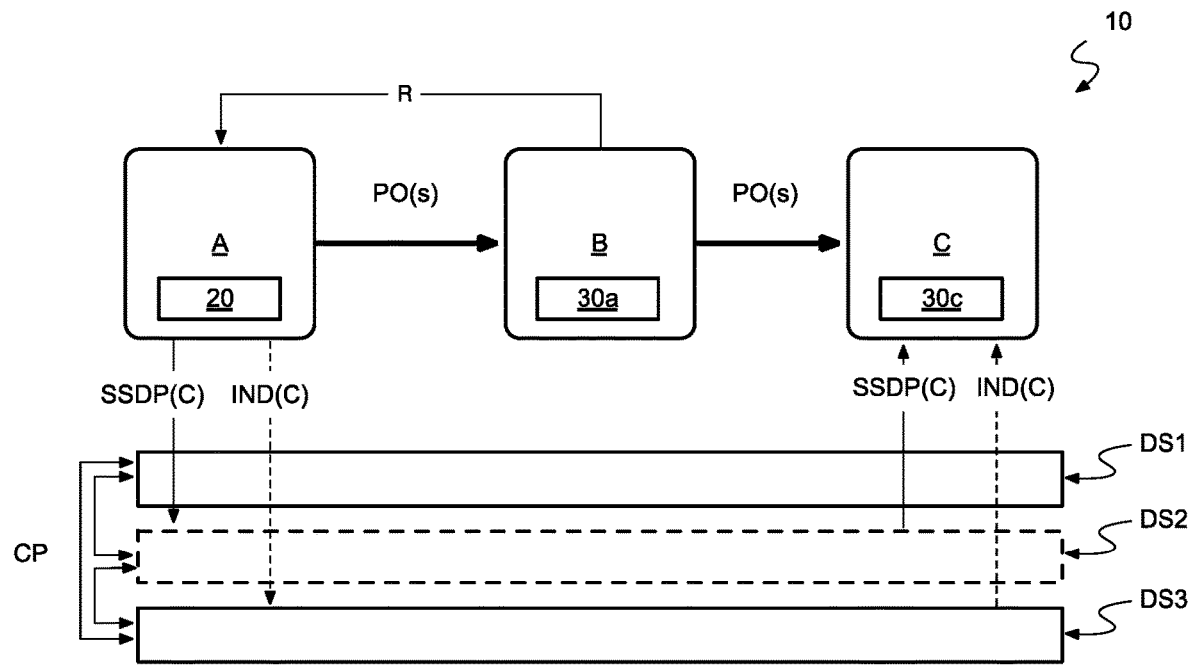
FIGS. 8A and 8B illustrate various different options of enabling further supply steps (hops) along a supply chain using blockchains as data storages in connection with one or more of the methods described above with respect to FIGS. 2 to 7.
Figure 8B:
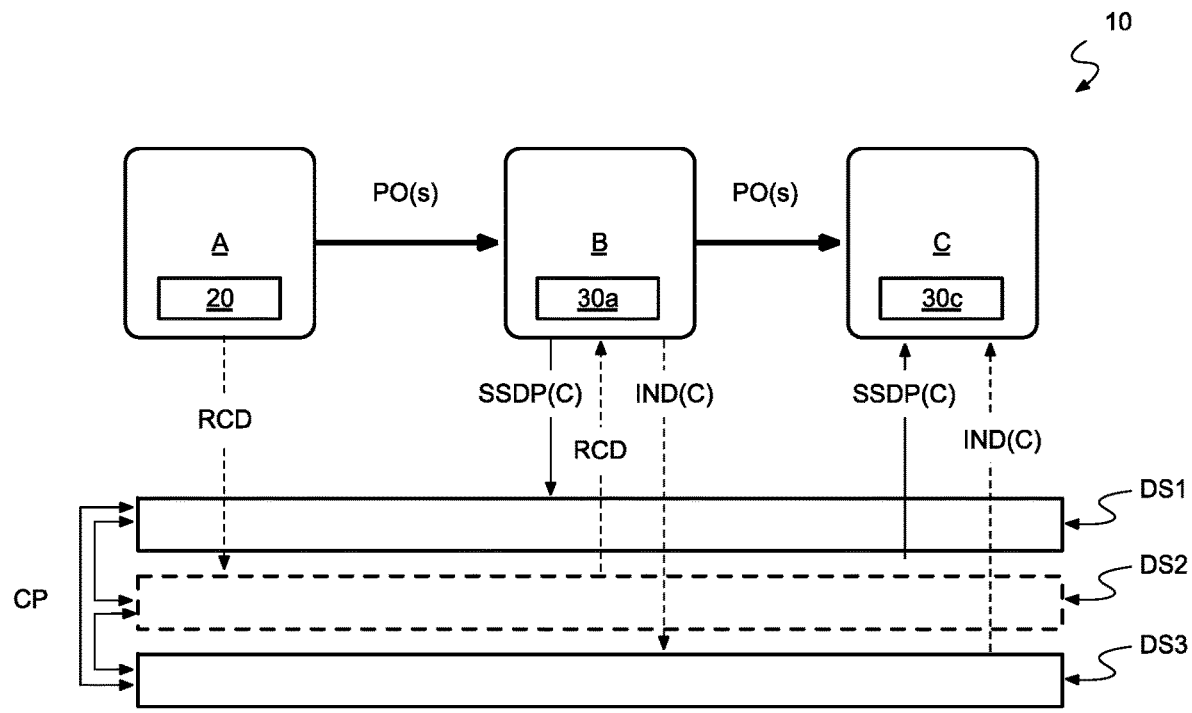

FIGS. 8A and 8B illustrate various different options of enabling further supply steps (hops) along a supply chain using blockchains as data storages in connection with one or more of the methods described above with respect to FIGS. 2 to 7. Specifically, FIG. 8A relates to embodiments, where node A is defined as the sole authority along the supply chain for determining the respective start data package for each hop. In addition, A may be the sole authority to also define further initialization data IDD replacing the original initialization data relating to a particular PO(s). While for each hop along the supply chain, a new secured start data package is needed, which is based on the respective predicted context data PCD for the recipient of the respective next hop, the initialization data may either be maintained unchanged or also changed.

For example, when in the embodiment of FIG. 8A the PO(s) supplied along the supply chain from A to C have reached node B and have been successfully authenticated there, B issues a request R to the sole authority, which is node A, to issue the necessary new SSDP(C) for the hop from B to C. Typically, B will provide predicted context data for C to A to enable the determination of a correct SSDP(C) either via one of the data storages DS1 to DS3 or over a separate, preferably secured information channel. Optionally, B may also request, e.g. as part of request R, new initialization data IND(C) based on new random context data RCD. As the RCD is needed to determine both the requested SSDP(C) and the IND(C) these two requested data items are related, as they are based on the same RCD. Per the request, A determines SSDP(C) and optionally also IND(C) and stores the result in the related data storage DS1 and DS3, respectively. When the PO(s) sent by B arrive at node C, system 30c of C can read SSDP(C) and, if applicable, IND(C) and successfully authenticate the PO(s) based thereon, provided the current context data (CCD) of C matches the PCD based on which the SSDP(C) was determined by A.

FIG. 8B, the contrary, relates to embodiments, where a former recipient of the PO(s) may itself take over the role of determining the necessary SSDP and optionally also related further IND for the next hop starting at that node. For example, node B may take over the previous role A had in relation to the hop from A to B for the further hop from B to C. In any case, B needs to determine the new SSDP(C) for C based on the related predicted context data for C. The random context data RCD used for this determination may either remain the same as for the previous hop. Accordingly, in the first variant, B may use the RCS determined as a result of the previous authentication of the PO(s) at node B upon arrival from node A. In the second variant, however, B needs to generate or receive new random context data and thus also determine the SSDP(C) and new initialization data IND(C) based thereon and store it into DS1 and DS3, respectively. The authentication process for the PO(s) at node C is then similar to that in the case of FIG. 8A.

Another related variant of the embodiments of FIG. 8B is a case, where the new SSDP(C) and optionally new initialization data IND(C) needs to be determined based on the original random context data RCD originally determined by A, but where such RCD is no longer available at A and B or maybe even A or its data is no longer existing at all. This may for example occur in cases, where the gross travel time of the PO(s) along the supply chain is rather long (e.g. years), as may be the case for goods having typically long storage times between consecutive hops, e.g. in the case of (raw) diamonds. A solution may then be that, as illustrated in FIGS. 1 and 8B, A stores its RCD into a data storage, e.g. DS 2, is a secured manner, e.g. encrypted, such that B or any authorized further node B may access it even when the original RCD is no longer available to B otherwise. B can then access RCD in DS2 and continue based thereon the data flow corresponding to the supply chain based on the method of FIG. 8B and the original RCD.

While above at least one exemplary embodiment of the present invention has been described, it has to be noted that a great number of variations thereto exists. Furthermore, it is appreciated that the described exemplary embodiments only illustrate non-limiting examples of how the present invention can be implemented and that it is not intended to limit the scope, the application or the configuration of the herein-described apparatus' and methods. Rather, the preceding description will provide the person skilled in the art with instructions for implementing at least one exemplary embodiment of the invention, wherein it has to be understood that various changes of functionality and the arrangement of the elements of the exemplary embodiment can be made, without deviating from the subject-matter defined by the appended claims and their legal equivalents.

LIST OF REFERENCE SIGNS 10 overall security solution
20 preparation system of node A
30a,b,c authentication systems of nodes B, B', and C, respectively
2FA two factor authentication
A, B, C nodes of supply chain
CCD current context data
CP cross-pointer, e.g. cross-blockchain pointer
CD encrypted context data
CS combination scheme, e.g. one of CS1, CS2 and CS3
CS1 first combination scheme
CS2 second combination scheme
CS3 third combination scheme, inverse of CS1
Dec decryption
DS data storage, in particular one of DS1, DS2 and DS3
DS1, . . . DS3 data storages, e.g. blockchains
Enc encryption
H data set, e.g. single value
HF1, HF2 hash functions
Hc predetermined combination of the initial hash values
Hi initial hash value
Ho original hash value
Ht test hash value
IDD identification data
IND initialization data
k discriminating characteristic or corresponding index thereto, respectively
MCD modified context data
PCD predicted context data
PIN personal identification number
PO(s) physical objects or group of physical objects
PrivA private key of A
PrivB private key of B PubA public key of A
PubB public key of B
PUF1-PUFn physical unclonable functions (PUF)
R request
RCD random context data
RR1 first reading result
Sign create digital signature
SN serial number(s)
SSDP secured start data package
T secured channel, tunnel
TAN transaction number
TC system of securely providing a time-variant combination scheme, trust center
TCD test context data

The invention claimed is:

1. A method of preparing a secured authentication of a physical object or group of physical objects (PO(s)) by a recipient (B, B') thereof, the method comprising:
receiving or generating predicted context data (PCD) representing a predicted future location relating to a designated next recipient (B; B') of the physical object or group of physical objects (PO(s)) and a related future time of presence of the physical object or group of physical objects (PO(s)) at the predicted future location;
receiving or generating random context data (RCD) indicating a random location and a random time;
combining, according to a first predetermined combination scheme, the predicted context data (PCD) and the random context data (RCD) to thereby derive modified context data (MCD) representing a modified random location and a modified random time;
encrypting the modified context data (MCD) to obtain a secured start data package (SSDP) representing the modified context data (MCD);
storing said secured start data package (SSDP), or causing it to be stored, to a first data storage (DS1) being accessible for providing the secured data package (SSDP) for a secured authentication of a physical object or group of physical objects (PO(s));
the method further comprising one of the following processes a) to c):
a) detecting by means of one or more sensors at least one discriminating characteristic (k) of said physical object or group of physical objects (PO(s)), to obtain for each discriminating characteristic (k) respective identification data ($IDD_k$) representing an identity of said related physical object or group of physical objects (PO(s));
applying a second predetermined cryptographic hash function (HF2) to a data set resulting from combining, according to a second predetermined combination scheme (CS2), the one or more respective identification data ($IDD_k$) obtained from the set of said at least one discriminating characteristic (k) and the random context data (RCD) to obtain an original hash value (Ho);
detecting by means of one or more sensors at least one discriminating characteristic (k) of said physical object or group of physical objects (PO(s)) to obtain for each discriminating characteristic (k) respective identification data ($IDD_k$) representing an identity of said related physical object or group of physical objects (PO(s)); or
b) applying to each of said identification data ($IDD_k$) a respective first predetermined cryptographic hash function ($HF_{1,k}$) to obtain a respective initial hash value ($Hi_k$) related to the respective discriminating characteristic (k); and applying a second predetermined cryptographic hash function (HF2) to a data set (H) resulting from combining, according to a second predetermined combination scheme (CS2), the one or more respective initial hash values ($Hi_k$) obtained from the set of said at least one discriminating characteristic and the random context data (RCD) to obtain an original hash value (Ho); or
(c) applying a second predetermined cryptographic hash function (HF2) to the random context data (RCD) to obtain an original hash value (Ho); and
outputting initialization data (IND) representing said respective original hash value (Ho).

2. The method of claim 1, wherein storing said secured start data package (SSDP) to said first data storage (DS1) involves storing the secured start data package (SSDP) to a blockchain or a blockless distributed ledger (DS1).

3. The method of claim 1, wherein:
said at least one discriminating characteristic (k) comprises a physical unclonable function, PUF ($PUF_k$); and
detecting said at least one discriminating characteristic (k) to obtain respective identification data ($IDD_k$) related thereto comprises:
applying a respective challenge of a respective predetermined challenge-response authentication scheme to the PUF to trigger a response by the PUF according to said authentication scheme in reaction to said challenge, and
detecting said respective response and generating respective identification data ($IDD_k$) representing said response;
applying a respective first predetermined cryptographic hash function ($HF_{1,k}$) comprises applying the respective first predetermined cryptographic hash function ($HF_{1,k}$) to said data representing said response to obtain a respective PUF-related initial hash value ($Hi_k$); and
outputting initialization data (IND) comprises outputting respective identification data ($IDD_k$) related to said discriminating characteristic (k), the identification data ($IDD_k$) comprising a representation of said respective PUF-related initial hash value ($Hi_k$).

4. The method of claim 1, further comprising applying a time and location-invariant information (SN) identifying or being otherwise specifically related to the physical object or group of physical objects (PO(s)), respectively.

5. The method of claim 1, wherein outputting said initialization data (IND) comprises one or more of the following:
adding a marking representing said initialization data (IND) to said physical object or group of physical objects (PO(s));
store said marking representing said initialization data (IND) or causing it to be stored to a third data storage (DS3) and adding to said physical object or group of physical objects (PO(s)) a representation of a pointer indicating where said initialization data (IND) can be accessed in the third data storage (DS3).

6. The method of claim 1, further comprising:
receiving a request for determination of another secured start data package (SSDP) relating to another predicted context data (PCD) representing another predicted future location relating to another designated next recipient (C) of the physical object or group of physical objects (PO(s)) and a related future time of presence of the physical object or group of physical objects (PO(s)) at said another predicted future location.

7. The method of claim 1, further comprising:
signing said obtained original hash value (Ho) with a digital signature pertaining to a supplier (A) of said physical object or group of physical objects (PO(s)) to the respective designated next recipient (B; B'); and
including said digital signature in the output respective initialization data (IND) or further initialization data (IND), respectively.

8. The method of claim 1, wherein:
the predicted context data (PCD) represents a predicted future location of a designated next recipient (C) of the physical object or group of physical objects (PO(s)) and a related future time of presence of the physical object or group of physical objects (PO(s)) at that predicted future location.

9. The method of claim 8, further comprising:
determining new initialization data (IND) based on the same random context data (RCD) as said new secured start data package (SSDP) and storing or causing said new initialization data (IND) to be stored.

10. A method of authenticating a physical object or group of physical objects (PO(s)), the method comprising:
receiving and decrypting a secured start data package (SSDP) representing encrypted context data (CD) representing a location and a related time to recover said context data (CD);
receiving or determining current context data (CCD) representing a current location of the physical object or group of physical objects (PO(s)) and a related current time of presence of the physical object or group of physical objects (PO(s)) at that current location;
combining, according to a predetermined combination scheme (CS3), the current context data (CCD) with the decrypted context data (CD) to thereby determine test context data (TCD), wherein the combination scheme (CS3) defines an inverse operation to a combination operation (CS1) previously used to generate the received context data (CD);
accessing initialization data (IND) related to said physical object or group of physical objects (PO(s) to recover from the initialization data (IND) an original hash value (Ho) being represented by the initialization data (IND);
the method further comprising one of the following processes a) to c):
a) detecting by means of one or more sensors at least one discriminating characteristic (k) of said physical object or group of physical objects (PO(s)) to obtain identification data ($IDD_k$) related to said respective discriminating characteristic (k), this identification data ($IDD_k$) representing a presumed identity of said related physical object or group of physical objects (PO(s)); and
generating a test hash value (Ht) by application of a second predetermined cryptographic hash function (HF2) to a combination (Hc), according to a further predetermined combination scheme (CS2), of the test context data (TCD) and each of said identification data ($IDD_k$) and a time-invariant and location-invariant information (SN) identifying or being otherwise specifically related to the said physical object or group of physical objects (PO(s)); or
b) detecting by means of one or more sensors at least one discriminating characteristic (k) of said physical object or group of physical objects (PO(s)) to obtain identification data ($IDD_k$) related to said respective discriminating characteristic (k), this identification data ($IDD_k$) representing a presumed identity of said related physical object or group of physical objects (PO(s)), wherein the at least one discriminating characteristic (k) comprises a physical unclonable function, PUF, and wherein detecting said discriminating characteristic to obtain identification data ($IDD_k$) comprises:
applying a respective challenge of a respective predetermined challenge-response authentication scheme to the PUF to trigger a response according to said authentication scheme in reaction to said challenge; and
detecting a respective response by the PUF in accordance with the respective challenge-response authentication scheme in reaction to the challenge and deriving therefrom said identification data;
applying a respective first predetermined cryptographic hash function ($HF_{1,k}$) to the respective identification data ($IDD_k$) to obtain a respective initial hash value ($Hi_k$) related to said discriminating characteristic (k); and
generating a test hash value (Ht) by application of a second predetermined cryptographic hash function (HF2) to a combination (Hc), according to a further predetermined combination scheme (CS2), of the test context data (TCD) and each of said initial hash values ($Hi_k$), and a time-invariant and location-invariant information identifying or being otherwise specifically related to the said physical object or group of physical objects;
c) generating a test hash value (Ht) by application of a second predetermined cryptographic hash function (HF2) to the test context data (TCD) or to a combination (Hc), according to a further predetermined combination scheme (CS2), of the test context data (TCD) and a time-invariant and location-invariant information identifying or being otherwise specifically related to the said physical object or group of physical objects;
wherein for the respective one of the processes a) to c), this second predetermined cryptographic hash function (HF2) is equal to a corresponding cryptographic hash function previously used to determine the original hash value (Ho) represented by the initialization data (IND), and wherein said further combination scheme (CS2) is equal to a corresponding combination scheme previously used to determine the original hash value (Ho) represented by the initialization data (IND); and
the method further comprises:
generating a first reading result (RR1) comprising:
a representation of the test hash value (Ht) and a representation of the original hash value (Ho), or
a matching output indicating whether or not, according to at least one predetermined matching criterion, the test hash value matches said original hash value and thus indicates authenticity of the physical object or group of physical objects.

11. The method of claim 10, wherein obtaining the identification data ($IDD_k$) comprises:
sensor-based detecting of said at least one discriminating characteristic (k) of said physical object or group of physical objects (PO(s));
generating object data representing said at least one discriminating characteristic (k) of said physical object or group of physical objects (PO(s));
communicating said object data to a system for automatic object recognition; and
receiving the digitally signed identification data from said system in response to said communicating of said object data.

12. The method of claim 10 further comprising a storage process comprising storing the first reading result (RR1), or causing it to be stored, into a block of a blockchain of a first set of one or more blockchains or into one or more nodes of a blockless distributed ledger of a first set of one or more blockless distributed ledgers.

13. The method of claim 12, wherein:
  detecting of at least one discriminating characteristic of the physical object or group of physical objects (PO(s)) comprises detecting a plurality of different ones of said at least one discriminating characteristic to obtain based thereon for each of said at least one discriminating characteristic (k) respective individual set of identification data ($IDD_k$) representing the physical object or group of physical objects (PO(s));
  generating the test hash value (Ht) is performed for each of the individual sets of identification data ($IDD_k$) separately to obtain for each of the individual sets of identification data ($IDD_k$) a respective individual test hash value ($Hi_k$);
  generating the first reading result is performed for each of the individual test hash values separately to obtain for each of said at least one discriminating characteristic a respective individual first reading result; and
  the storage process comprises storing each of said individual first reading results respectively causing it to be stored into a block of a respective individual dedicated blockchain in said first set of blockchains or into one or more nodes of a respective individual dedicated blockless distributed ledger in said first set of blockless distributed ledgers.

14. The method of claim 10, further comprising determining a new secured start data package (SSDP) for a secured authentication of said physical object or group of physical objects (PO(s)) at a further recipient (C) thereof.

15. The method of claim 14 wherein determining said new secured start data package (SSDP) comprises:
  issuing a request (R) for determining such new secured start data package (SSDP) for a secured authentication of said physical object or group of physical objects (PO(s)) at a further recipient (C) thereof to an authorized provider (A) of said new secured start data package (SSDP) and receiving said requested new secured start data package (SSDP) in response to the request.

16. The method of claim 10, further comprising:
  receiving and storing data representing the predetermined combination scheme (CS), a time and location-invariant information (SN) identifying or being specifically related to the said physical object or group of physical objects, and metadata (MD(CS(SN))) defining a limited validity period of the combination scheme (CS);
  receiving a request for the combination scheme (CS) and identity information (SN) identifying or being specifically related to a physical object or group of physical objects (PO(s)) from a requesting authentication system;
  authenticating the requesting authentication system; and
  when the requesting system is successfully authenticated as being authorized and according to previously stored metadata (MD(SN)) corresponding to the received identity information (SN), the related combination scheme (CS(SN)) to which the metadata (MD(SN)) pertains is still valid, outputting data representing that related combination scheme (CS(SN)) over a data channel (T) being secured against interception to the requesting system; or
  otherwise, denying the request.

17. A non-transitory, computer-readable medium having stored thereon a computer program comprising instructions, which when executed on one or more processors carries out a method comprising:
  receiving and decrypting a secured start data package (SSDP) representing encrypted context data (CD) representing a location and a related time to recover said context data (CD);
  receiving or determining current context data (CCD) representing a current location of the physical object or group of physical objects (PO(s)) and a related current time of presence of the physical object or group of physical objects (PO(s)) at that current location;
  combining, according to a predetermined combination scheme (CS3), the current context data (CCD) with the decrypted context data (CD) to thereby determine test context data (TCD), wherein the combination scheme (CS3) defines an inverse operation to a combination operation (CS1) previously used to generate the received context data (CD);
  accessing initialization data (IND) related to said physical object or group of physical objects (PO(s) to recover from the initialization data (IND) an original hash value (Ho) being represented by the initialization data (IND);
  the method further comprising one of the following processes a) to c):
  a) detecting by means of one or more sensors at least one discriminating characteristic (k) of said physical object or group of physical objects (PO(s)) to obtain identification data ($IDD_k$) related to said respective discriminating characteristic (k), this identification data ($IDD_k$) representing a presumed identity of said related physical object or group of physical objects (PO(s)); and
  generating a test hash value (Ht) by application of a second predetermined cryptographic hash function (HF2) to a combination (Hc), according to a further predetermined combination scheme (CS2), of the test context data (TCD) and each of said identification data ($IDD_k$) and a time-invariant and location-invariant information (SN) identifying or being otherwise specifically related to the said physical object or group of physical objects (PO(s)); or
  b) detecting by means of one or more sensors at least one discriminating characteristic (k) of said physical object or group of physical objects (PO(s)) to obtain identification data ($IDD_k$) related to said respective discriminating characteristic (k), this identification data ($IDD_k$) representing a presumed identity of said related physical object or group of physical objects (PO(s)), wherein the at least one discriminating characteristic (k) comprises a physical unclonable function, PUF, and wherein detecting said discriminating characteristic to obtain identification data ($IDD_k$) comprises:
    applying a respective challenge of a respective predetermined challenge-response authentication scheme to the PUF to trigger a response according to said authentication scheme in reaction to said challenge; and
    detecting a respective response by the PUF in accordance with the respective challenge-response authentication scheme in reaction to the challenge and deriving therefrom said identification data;
  applying a respective first predetermined cryptographic hash function ($HF_{1,k}$) to the respective identification data (IDD$_k$) to obtain a respective initial hash value (Hi$_k$) related to said discriminating characteristic (k); and generating a test hash value (Ht) by application of a second predetermined cryptographic hash function (HF2) to a combination (Hc), according to a further predetermined combination scheme (CS2), of the test context data (TCD) and each of said initial hash values (Hi$_k$), and a time-invariant and location-invariant information identifying or being otherwise specifically related to the said physical object or group of physical objects;

c) generating a test hash value (Ht) by application of a second predetermined cryptographic hash function (HF2) to the test context data (TCD) or to a combination (Hc), according to a further predetermined combination scheme (CS2), of the test context data (TCD) and a time-invariant and location-invariant information identifying or being otherwise specifically related to the said physical object or group of physical objects;

wherein for the respective one of the processes a) to c), this second predetermined cryptographic hash function (HF2) is equal to a corresponding cryptographic hash function previously used to determine the original hash value (Ho) represented by the initialization data (IND), and wherein said further combination scheme (CS2) is equal to a corresponding combination scheme previously used to determine the original hash value (Ho) represented by the initialization data (IND); and the method further comprises:
  generating a first reading result (RR1) comprising:
    a representation of the test hash value (Ht) and a representation of the original hash value (Ho), or
    a matching output indicating whether or not, according to at least one predetermined matching criterion, the test hash value matches said original hash value and thus indicates authenticity of the physical object or group of physical objects.

* * * * *